US012293272B1

(12) United States Patent
Poulis et al.

(10) Patent No.: US 12,293,272 B1
(45) Date of Patent: May 6, 2025

(54) AGENTIC WORKFLOW SYSTEM AND METHOD FOR GENERATING SYNTHETIC DATA FOR TRAINING OR POST TRAINING ARTIFICIAL INTELLIGENCE MODELS TO BE ALIGNED WITH DOMAIN-SPECIFIC PRINCIPLES

(71) Applicant: SEEKR Technologies, Inc., Vienna, VA (US)

(72) Inventors: Stefanos Poulis, Vienna, VA (US); Andrew J. Bauer, Vienna, VA (US); Diego A. Mesa, Vienna, VA (US); Robin J. Clark, Vienna, VA (US); Patrick C. Condo, Vienna, VA (US)

(73) Assignee: SEEKR Technologies, Inc., Vienna, VA (US)

( * ) Notice: Subject to any disclaimer, the term of this patent is extended or adjusted under 35 U.S.C. 154(b) by 0 days.

(21) Appl. No.: 19/008,444

(22) Filed: Jan. 2, 2025

Related U.S. Application Data

(63) Continuation-in-part of application No. 19/004,001, filed on Dec. 27, 2024, which is a continuation of application No. 18/646,104, filed on Apr. 25, 2024, now Pat. No. 12,182,678, which is a continuation-in-part of application No. 18/599,955, filed on Mar. 8, 2024, now Pat. No. 12,124,932.

(51) Int. Cl.
G06N 20/00 (2019.01)
(52) U.S. Cl.
CPC .................... *G06N 20/00* (2019.01)
(58) Field of Classification Search
CPC ...................................... G06N 20/00
See application file for complete search history.

(56) References Cited

U.S. PATENT DOCUMENTS 5,696,962 A 12/1997 Kupiec
5,909,510 A 6/1999 Nakayama
(Continued)

FOREIGN PATENT DOCUMENTS

WO WO/0077690 A1 12/2000

OTHER PUBLICATIONS

Sun, "Principle-Driven Self-Alignment of Language Models from Scratch with Minimal Human Supervision", 37th Conference on Neural Information Processing Systems, 2023. (Previously supplied). (Year: 2023).* for root node R, recursively generate a summary despite the lack of text at the root node level as shown in FIG. 6B tree B "Summary" that appears in root node R.

(Continued)

*Primary Examiner* — Dave Misir
(74) *Attorney, Agent, or Firm* — Manatt, Phelps & Phillip

(57) ABSTRACT

An agentic workflow system and method generate question and answer pairs and prompts that may be used to aligns generative artificial intelligence (a large language model (LLM) or a large multimodal model (LMM)) with the principles of a specific domain so that the generative artificial intelligence is better able to respond to a user query in the specific domain. The system and method may also generate aligning processes that may be used to post-train an already trained generative artificial intelligence system or fine tune the training of the generative artificial intelligence system to align that generative artificial intelligence system with the principles of the specific domain. The system and method may be used to align the generative artificial intelligence system to a plurality of different domains.

16 Claims, 11 Drawing Sheets

(56) References Cited

U.S. PATENT DOCUMENTS

| | | | |
|---|---|---|---|
| 6,026,388 | A | 2/2000 | Liddy et al. |
| 6,119,114 | A | 9/2000 | Smadja |
| 6,226,668 | B1 | 5/2001 | Silverman |
| 6,601,075 | B1 | 7/2003 | Huang et al. |
| 6,651,057 | B1 | 11/2003 | Jin et al. |
| 6,807,565 | B1 | 10/2004 | Dodrill et al. |
| 6,847,969 | B1 | 1/2005 | Mathai et al. |
| 6,990,514 | B1 | 1/2006 | Dodrill et al. |
| 7,062,485 | B1 | 6/2006 | Jin et al. |
| 7,076,484 | B2 | 7/2006 | Dworkis et al. |
| 7,120,925 | B2 | 10/2006 | D'Souza et al. |
| 7,197,497 | B2 | 3/2007 | Cossock |
| 7,240,067 | B2 | 7/2007 | Timmons |
| 7,313,622 | B2 | 12/2007 | Lee et al. |
| 7,475,404 | B2 | 1/2009 | Hamel |
| 7,516,123 | B2 | 4/2009 | Betz et al. |
| 7,606,810 | B1 | 10/2009 | Jeavons |
| 7,827,125 | B1 | 11/2010 | Rennison |
| 7,836,060 | B1 | 11/2010 | Rennison |
| 7,870,117 | B1 | 1/2011 | Rennison |
| 7,925,973 | B2 | 4/2011 | Allaire et al. |
| 7,933,893 | B2 | 4/2011 | Walker et al. |
| 8,001,064 | B1 | 8/2011 | Rennison |
| 8,060,518 | B2 | 11/2011 | Timmons |
| 8,195,666 | B2 | 6/2012 | Jeavons |
| 8,219,911 | B2 | 7/2012 | Clarke-Martin et al. |
| 10,733,452 | B2 | 8/2020 | Attorre |
| 11,875,240 | B1* | 1/2024 | Bosnjakovic ....... G06F 16/3329 |
| 2001/0021934 | A1 | 9/2001 | Yokoi |
| 2002/0007393 | A1 | 1/2002 | Hamel |
| 2002/0062340 | A1 | 5/2002 | Kloecker et al. |
| 2002/0095336 | A1 | 7/2002 | Trifon et al. |
| 2002/0147578 | A1 | 10/2002 | O'Neil et al. |
| 2002/0169669 | A1 | 11/2002 | Stetson et al. |
| 2002/0169771 | A1 | 11/2002 | Melmon et al. |
| 2003/0191816 | A1 | 10/2003 | Landress et al. |
| 2003/0212954 | A1 | 11/2003 | Patrudu |
| 2003/0217052 | A1 | 11/2003 | Rubenczyk et al. |
| 2004/0049574 | A1 | 3/2004 | Watson et al. |
| 2004/0117400 | A1 | 6/2004 | McCrystal et al. |
| 2005/0091200 | A1 | 4/2005 | Melton et al. |
| 2005/0188402 | A1 | 8/2005 | de Andrade et al. |
| 2006/0031419 | A1 | 2/2006 | Huat |
| 2006/0047632 | A1 | 3/2006 | Zhang |
| 2006/0117348 | A1 | 6/2006 | D'Souza et al. |
| 2007/0033531 | A1 | 2/2007 | Marsh |
| 2007/0038567 | A1 | 2/2007 | Allaire et al. |
| 2007/0038931 | A1 | 2/2007 | Allaire et al. |
| 2007/0260671 | A1 | 8/2007 | Harinstein et al. |
| 2008/0010142 | A1 | 1/2008 | O'Brien et al. |
| 2008/0104113 | A1 | 5/2008 | Wong |
| 2008/0221983 | A1 | 9/2008 | Ausiannik et al. |
| 2009/0024574 | A1 | 1/2009 | Timmons |
| 2009/0197581 | A1 | 8/2009 | Gupta et al. |
| 2009/0248668 | A1 | 10/2009 | Zheng |
| 2010/0100545 | A1 | 4/2010 | Jeavons |
| 2010/0313116 | A1 | 12/2010 | Hyman |
| 2011/0166918 | A1 | 7/2011 | Allaire et al. |
| 2011/0191163 | A1 | 8/2011 | Allaire et al. |
| 2012/0078895 | A1 | 3/2012 | Chu-Carroll |
| 2012/0143792 | A1 | 6/2012 | Wang |
| 2018/0101534 | A1 | 4/2018 | Alexander, Jr |
| 2019/0065744 | A1 | 2/2019 | Gaustad |
| 2019/0163327 | A1 | 5/2019 | Otero |
| 2020/0125639 | A1 | 4/2020 | Doyle |
| 2020/0126533 | A1 | 4/2020 | Doyle |
| 2021/0019339 | A1 | 1/2021 | Ghulati |
| 2023/0316000 | A1* | 10/2023 | Mukherjee ........... G06N 3/0475 |
| 2024/0111498 | A1* | 4/2024 | Vaughn ..................... G06F 8/30 |
| 2024/0184991 | A1* | 6/2024 | Mahabaleshwarkar ...................... G06F 40/35 |
| 2024/0202221 | A1* | 6/2024 | Siebel .................... G06N 20/00 |
| 2024/0281472 | A1* | 8/2024 | LaRhette .............. G06F 16/248 |
| 2024/0419713 | A1* | 12/2024 | Siebel .................... G06N 3/045 |

OTHER PUBLICATIONS

Siriwardhana, "Improving the Domain Adaptation of Retrieval Augmented Generation (RAG) Models for Open Domain Question Answering", Transactions of the Association for Computational Linguistics, vol. 11, pp. 1-17, 2023. (Previously supplied). (Year: 2023).*

Shen, "Large Language Model Alignment: A Survey", 2023. (Previously supplied). (Year: 2023).*

Durante, "Agent AI: Surveying the Horizons of Multimodal Interaction", Jan. 25, 2024. (Year: 2024).*

Baulepur, "Aligning Language Models with Factuality and Truthfulness" Thesis submitted in partial fulfillment of Bachelor of Science in Computer Science, University of Illinois At Urbana-Champaign, 2023, 50 pages.

Azaria, et al., "The Internal State of an LLM Knows When its Lying", School of Computer Science, Ariel University, Israel and Machine Learning Dept., Carnegie Mellon University, Pittsburgh, PA, Apr. 2023, 10 pages.

Lee, et al., "Linguistic Properties of Truthful Response," University of Pennsylvania, PA, USA., Jun. 2023, 6 pages.

Poulis, "Algorithms for Interactive Machine Learning", Dissertation submitted in partial fulfillment of degree of Doctor of Philosophy in Computer Science, University of California, San Diego, 2019, 148 pages.

Yang, et al., "RefGPT: Reference—Truthful & Customized Dialogues Generation by GPTs and for GPTs", Shanghai Jiao Tong University, Hong Kong Polytechnical University, Beijing University of Posts and Telecommunications, May 2023, 20 pages.

Pan, et al., "On the Risk of Misinformation Pollution with Large Language Models", National University of Singapore, University of California, Santa Barbara, University of Waterloo, MBZUAI, Zhejiang University, May 2023, 14 pages.

McKenna, et al., "Sources of Hallucination by Large Language Models on Inference Tasks", University of Edinburgh, Google Research, Macquarie University, May 2023, 17 pages.

Sun, "Principle-Driven Self-Alignment of Language Models from Scratch with Minimal Human Supervision", 37th Conference on Neural Information Processing Systems, 2023. (Year: 2023).

Siriwardhana, "Improving the Domain Adaptation of Retrieval Augmented Generation (RAG) Models for Open Domain Question Answering", Transactions of the Association for Computational Linguistics, vol. 11, pp. 1-17, 2023. (Year: (2023).

Shen, "Large Language Model Alignment: A Survey", 2023. (Year: 2023), 76 pgs.

Dawson, "Algorithmic Adjudication and Constitutional AI—The Promise of A Better AI Decision Making Future?", Year 2024, 29 pgs.

Huang, "Collective Constitutional AI: Aligning a Language Model with Public Input", Year 2024, 23 pgs.

Bai, "Constitutional AI: Harmlessness from AI Feedback", Year 2022, 24 pgs.

Xu, "A Survey on Knowledge Distillation of Large Language Models" Oct. 2024, 43 pgs, https://arxiv.org/pdf/2402.13116.

Mitra, "AgentInstruct: Toward Generative Teaching with Agentic Flows" Jul. 2024, 32 pgs, https://arxiv.org/pdf/2407.03502.

Ghosh, "A Closer Look at the Limitations of Instruction Tuning" Jul. 2024, 31 pgs, https://arxiv.org/abs/2402.05119.

Gekhmann, "Does Fine-Tuning LLMs on New Knowledge Encourage Hallucinations?" Oct. 2024, 20 pgs, https://arxiv.org/abs/2405.05904.

Mecklenburg, "Injecting New Knowledge into Large Language Models via Supervised Fine-Tuning" Apr. 2024, 16 pgs, https://arxiv.org/abs/2404.00213.

Zhang, "Self-Tuning: Instructing LLMs to Effectively Acquire New Knowledge through Self-Teaching" Jun. 2024, 30 pgs, https://arxiv.org/abs/2406.06326.

Rozner, "Knowledge Editing in Language Models via Adapted Direct Preference Optimization" Sep. 2024, 13 pgs, https://arxiv.org/abs/2406.09920.

Ye, "Qilin Med: Multi-stage Knowledge Injection Advanced Medical Large Language Model", 13 pgs, Apr. 2024.

(56) References Cited

OTHER PUBLICATIONS

Ovadia, "Fine-Tuning or Retrieval? Comparing Knowledge Injection in LLMs", Jan. 2024, 14 pgs, https://arxiv.org/abs/2312.05934.

Zhu, "FanOutQA: A Multi-Hop, Multi-Document Question Answering Benchmark for Large Language Models" Jun. 2024, 20 pgs, https://arxiv.org/abs/2402.14116.

Soudani, "Fine Tuning vs. Retrieval Augmented Generation for Less Popular Knowledge" Dec. 2024, 11 pgs, https://arxiv.org/abs/2403.01432.

Zhang, "RAFT: Adapting Language Model to Domain Specific RAG" 12 pgs, Jun. 2024, https://arxiv.org/abs/2403.10131.

\* cited by examiner

AGENTIC WORKFLOW SYSTEM AND METHOD FOR GENERATING SYNTHETIC DATA FOR TRAINING OR POST TRAINING ARTIFICIAL INTELLIGENCE MODELS TO BE ALIGNED WITH DOMAIN-SPECIFIC PRINCIPLES

PRIORITY CLAIMS/RELATED APPLICATIONS

This patent applications is a continuation in part and claims priority under 35 USC 120 to U.S. patent application Ser. No. 19/004,001 filed Dec. 27, 2024 that is a continuation and claims priority under 35 USC 120 to U.S. patent application Ser. No. 18/646,104 filed Apr. 25, 2024 (now U.S. Pat. No. 12,182,678 issued on Dec. 31, 2024) that is a continuation in part and claims priority under 35 USC 120 to U.S. patent application Ser. No. 18/599,955 filed Mar. 8, 2024 and entitled "SYSTEMS AND METHODS FOR ALIGNING LARGE MULTIMODAL MODELS (LMMs) OR LARGE LANGUAGE MODELS (LLMs) WITH DOMAIN-SPECIFIC PRINCIPLES" (now U.S. Pat. No. 12,124,932 issued on Oct. 22, 2024), the entirety of all of which are incorporated by reference and form part of the specification.

APPENDICES

Appendix A (3 pages) is a document of the Global Alliance for Responsible Media (GARM) domain and its principles. Appendix B (4 pages) is a document of the civility domain and it principles. Appendix C (15 pages) is an example document tree for an example document that is an airline customer service plan. These appendices are part of the specification.

FIELD

The disclosure relates generally to artificial intelligence models (including large multimodal models (LMMs) and large language models (LLMs)) and in particular to one or more solutions to address problems and issues with current artificial intelligence models to provide systems and method for responsible artificial intelligence models.

BACKGROUND

Artificial intelligence (AI) and machine learning are well known and have been used is various contexts for many years. Generative artificial intelligence (also generative AI or GenAI) is a new form of AI that is capable of generating text, images, or other media, using generative models. Generative AI models learn patterns and structure that are present in their input training data and then generate new data with similar characteristics and properties. Importantly, Generative AI models do not merely generate copies of their training data but learn to generalize and excel on tasks that require complex reasoning and commonsense steps that may have not been present in their training dataset. There are different types of GenAI that may include large language models (LLMs) that are text content-based or large multimodal models (LMM) that use all types of content and modalities (hence the multimodal name).

The introduction of a transformer-based architecture in 2018 enabled significant breakthroughs in Generative AI. Transformer-based models have unprecedented capabilities of modeling sequential data, due to their attention-based mechanism. The capability of Transformer models to scale have also added to their increased and ongoing popularity. There are currently several notable commercially available systems such as large language model chatbots, like OpenAI® ChatGPT, Microsoft® Bing Chat, Google® Bard, and Meta® LLaMA, and text-to-image artificial intelligence art systems such as Stable Diffusion, Midjourney, and DALL-E. Generative AI has uses across a wide range of industries, including art, writing, software development, product design, healthcare, finance, gaming, marketing, and fashion.

One type of generative AI is powered by a large language model (LLM) that is a type of language model notable for its ability to achieve general-purpose language understanding and generation. Each LLM acquires these abilities by using massive amounts of data to learn billions of parameters during training and consuming large computational resources during their training and operation. LLMs are artificial neural networks (mainly Transformers) and are (pre-) trained using self-supervised learning and semi-supervised learning. Language models, including LLMs, work by taking an input text and repeatedly predicting the next token or word. Notable current examples of LLM systems include OpenAI's GPT models (e.g., GPT-3.5 and GPT-4, used in ChatGPT), Google's PaLM (used in Bard), and Meta's LLaMa, as well as BLOOM, Ernie 3.0 Titan, and Anthropic's Claude 2.

While LLM (and more generally, Generative AI) systems are incredibly powerful and useful in their ability to generate human-like content and assist with a wide range of tasks, an artificial intelligence system also raise a number of important ethical, moral, social, and technical considerations. For example, it is widely known that LLMs often generate content that may be factually incorrect, toxic, harmful, and deceiving. Some current LLMs use a known reinforcement Learning with Human Feedback (RLHF) technique to overcome some of the above issues, but RLHF alone, often does not fully resolve the issue. While foundation LLMs can perform remarkably well in a broader context, they lack the domain-specific knowledge to be helpful in most industrial or business applications. Generically pre-trained LLMs have known limitations when asked to perform tasks that may require adherence or compliance to principles of a specific domain. For example, domains such as banking, retail, journalism, legal, financial, medical, pharmaceutical, education, etc. have certain standards, intentions, rules or values that specify what constitutes acceptable model behavior. Generically pre-trained foundation LLMs may not have knowledge of the domain-specific organizational guidelines, standards, rules, intentions or values; these are collectively defined as domain principles. Hence, foundation LLMs will be challenged in well-defined tasks dictated by domain principles and there are several technical problems with safely applying them ubiquitously.

No Domain Information

First, most foundation LLMs, are pre-trained on massive corpora that may be missing crucial and recent world knowledge and information. Typically, the training corpora are just snapshots of data collected at a specific moment in time; this limits LLMs utility, especially when the domain-specific context may not exist in the pre-training corpora.

Information Conflicting with Domain-Specific Principles

Second, because LLM pre-training generally ignores domain-specific principles, it can lead to the LLM model having seen information in its training set that is in conflict with the domain-specific principles. In this case, even elaborate prompt engineering techniques, including few-shot, Chain-of-Thought, Tree-of-Thoughts etc. are not enough to guarantee that the LLM behaves within the scope of the domain. The conflict between what the model has seen in its training set and the domain-specific principles will lead to an averaging effect and will cause the model to produce a low-confidence signal. Hence, alignment is necessary to ensure that the model forgets the conflicting knowledge and enforce the model to learn the domain-specific signals.

Tangentially Related Domain-Information

In addition, whatever potential knowledge the LLM may have, it will have obtained it from the pre-training data, which may only be tangentially related to the principles in each specific domain.

Unclear Understanding of Domain-Principles

The foundation LLMs do not have a clear understanding of the principles, how they are defined and the specific criteria that indicate appropriate behavior.

Prompt Engineering and Inference

LLMs generate human-like text through a process known as generative inference in which, given an input prompt, generative LLM inference generates text outputs, by iteratively predicting the next token in a sequence. Complicated prompts required for typical unaligned LLMs are time consuming and expensive. Importantly, complicated prompts increase computation time and latency, making the models unusable for specific applications. Alignment ensures that the model will concisely learn the domain-specific task/s and eliminates the need for complicated, lengthy and multistep prompts.

In addition to the LLMs discussed above, large multimodal models (LMMs) also have the same issues and limitations. LMMs exist because text alone (the LLM) is low-bandwidth, scarce, and not rich enough to achieve human-level commonsense and intelligence: humans don't learn just from text. To solve this problem and expand capabilities, the LMMs focus on additional modalities (such as image, video, and audio inputs, as well as text inputs). These LMMs, like the LLMs, if generically pre-trained, are not aligned with domain specific principles.

The above limitations and failures of known LLMs/Generative AI and LMMs are caused by technical problems with how LLMs and LMMs work and generate responses as described above. It is thus desirable to provide a framework, including systems and methods to generate instructions to train and align an artificial intelligence model and/or take an existing pre-trained LLM or LMM and post-train or fine-tune the LLM or LMM to ensure that it is aligned with the domain-specific principles and that it behaves within the rules, guidelines and ethics of the domain.

Besides alignment during training or fine-tuning, LILMs or LMMMs may need to be aligned during inference. This may be achieved by the LLM being asked to validate its own response. This process forces the LLM to "think" harder about its output, revisit the chain-of-thought it took to arrive to a specific response and validate it against the domain-specific principles. This process is called post-editing and it may be required to ensure that the LLM produces responses that are aligned with the domain-specific principles.

Thus, the disclosure is directed towards providing a technical solution towards providing a LLLM or LMM model that may be post-trained or fine-tuned during training with domain-specific knowledge, thus having a better understanding of the domain and being able to operate within the domain context more accurately and safely.

DETAILED DESCRIPTION OF ONE OR MORE EMBODIMENTS

Figure 1:
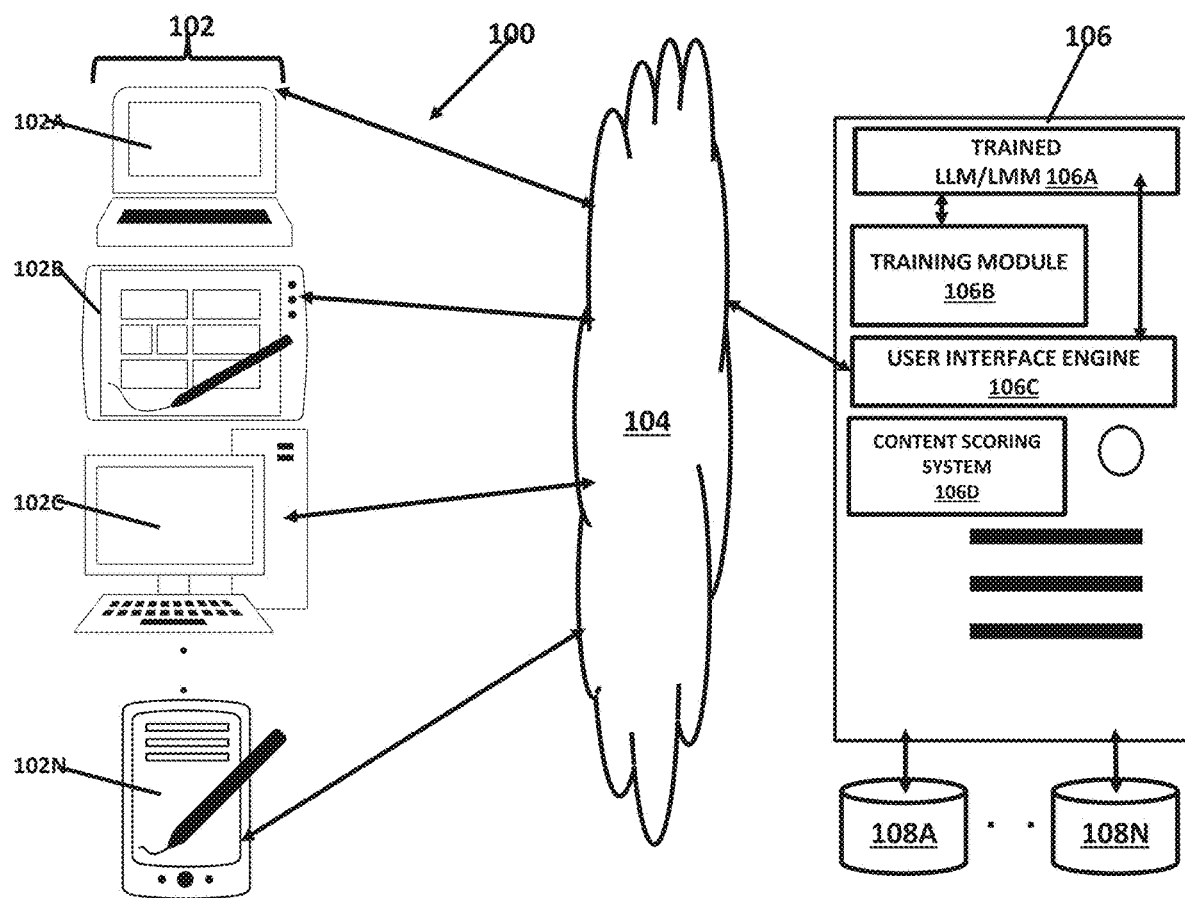
FIG. 1 is a system that incorporates an LLM or LMM aligned with domain specific principles to generate responses to user's prompts.

The disclosure is particularly applicable to systems and methods for aligning large multimodal models (LMMs) or large language models (LLMs) (collectively "artificial intelligence models") with domain-specific principles using a well-known transformer architecture. The aligning of the artificial intelligence models involves using domain-specific principle data and documents to generate a plurality of instructions that are then used to align the artificial intelligence models. As discussed below, an agentic workflow may be used to generate the plurality of instructions (such as by using the synthetic data generating process discussed below) and the artificial intelligence model may be aligned by pre-training on domain specific text corpora and/or fine-tuned using training data messages (See FIGS. 2-3). Alternatively, the artificial intelligence model may be aligned by post inference alignment processes (See FIG. 4) that use the plurality of generated instructions (generated by the synthetic data generating process discussed below) to post-train the artificial intelligence model. Post-training collectively refers to additional pre-training and/or fine-tuning on an already pre-trained model.

The resultant aligned LMM or LMM or the aligned responses from the LMM or LLM for a post-trained LLM or LMM are a technical solution to the problems and limitations with known LLMs and LMMs and is able to perform tasks, such as content generation, classification, chat, summarization etc. that comply with the specific domain's principles and context. In one embodiment, the LMM or LLM will be trained using training instructions/data points that are generated for the domain-specific principles. It is noted that the system and method disclosed below may be used to additionally pre-train or fine-tune training for either an LLM or an LMM and both are within the scope of the disclosure. Each of the domain specific aligned LLM and domain specific aligned LMM make inference and prompting less complicated, much more efficient and cost-effective. For purposes of this disclosure, artificial intelligence (AI) refers to a generative AI system that may be implemented by an LLM or an LMM.

The system and method described below may be used to align an LMM or LMM with one or more different domain specific principles. Furthermore, the system and method may be used to train a single LLM or LMM to be aligned with two or more domain principles at the same time. In some embodiments, an LLM or LMM may be aligned by the system to domain specific principles either through continued pre-training or fine tuning on synthetically generated training data messages (See FIG. 2).

The domain as used in this disclosure is a set of data that may be as input to drive the instruction generation process as discussed below wherein the generated instructions align the LLM or LMM to the particular domain. For example, the domain may be rules or standards for a particular industry or vertical (with examples provided below), a set of forms, policies, etc., for an organization, a set of files/data of a person's computer or more than one person's computer and/or an application data set including a set of blog posts.

Figure 2:
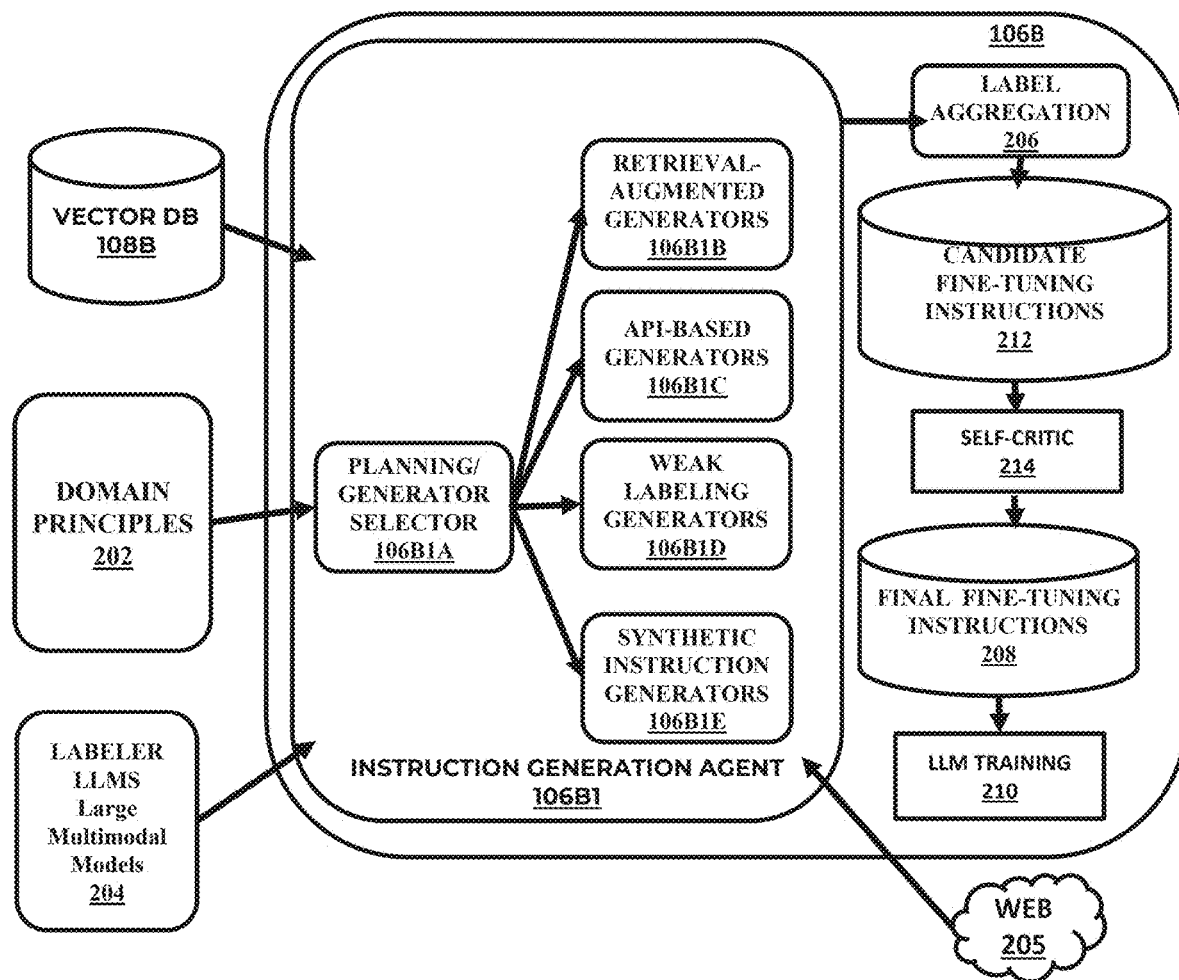
FIG. 2 illustrates more details of a training module 106B of the system in FIG. 1 that can post-train or fine tune the training of an LLM or LMM to align with different one or more domain specific principles.

The system and method described below for producing a domain-specific instruction set may be a training data messages-set generating agent. In an embodiment in which a plurality of instructions are used to train the artificial intelligence model to align that artificial intelligence model (see FIG. 2), the training data messages-set generating agent may be an instruction generation agent 106B1 as shown in FIG. 2. In an embodiment in which a plurality of instructions are used to inform the alignment processes 410 that post inference align a response from the artificial intelligence model, the training data messages-set generating agent may be the similar to the instruction generation agent 106B1 (shown in FIG. 2, but not in FIG. 4) In is noted that the training data messages-set may be used for other purposes that those shown in FIGS. 2 and 3. The training data messages-set generation agent 106B1 is able to plan the task of generating the training messages, according to the information that it is given that may include the domain data. The agent 106B1 may have access to one or more external tools, APIs, such as a search API, a code interpreter or a calculator, etc., to augment its knowledge. The agent's planning involves processing, decomposing and understanding the user-provided domain principles and executing the training messages generation task(s). To generate the training messages set to align an LLM or LMM (either by training or post inference), the agent 106B1 may perform: retrieval: with access to search APIs and other tools, the agent will retrieve relevant documents from the web or other data sources and will transform them to instructions; and/or self-reflection and self-critique. For example, the agent 106B1 will generate critiques to criticize its own output, in terms of factuality, overall quality, and alignment with the domain principles as shown in FIG. 5B. The generated critiques will be used to decide whether the generated training message is sensible in relation to the task and the domain-specific principles and whether it should be retained or discarded as discussed below in more detail.

The domain may be a set of rules, standard(s) for an industry, or a vertical domain. A well-known Global Alliance for Responsible Media (GARM) standard (See Appendix A) or a civility standard (See Appendix B) may be examples of the domain. Examples of further details for each of these domains, a user prompt, the LLM response provided by the domain principle trained LLM and the LLM response for known LLM models are provided below. Note that for illustration purposes, the example of the LLM trained for domain specific principles is an LLM and the known LLMs for comparison are Llama2 and GPT-4 which are well-known and understood publicly available LLMs whose content is text. Note that the LLM aligned with domain specific principles may be aligned to any of one or more domains and those domains are not limited to the three examples provided below. Furthermore, the domains may include a set of rules set by a third party, like GARM, a standard used in an industry, like a content standard such as civility and/or an industry or a specific area of focus, like agriculture. In addition, when an LLM is aligned to a particular domain's principles, that LLM is trained about different data than a different LLM that is aligned with a different domain. Another example of the vertical domain is agriculture, legal or medical. Furthermore, the domain may be policies and documents for an entity or may be an application (e.g. someone's computer or phone, a company's internal data, files etc.), e.g. files/data on device (e.g. laptop, desktop computer, phone, tablet, attached storage etc.); files/data on cloud/shared storage (e.g. shared drive); and/or files/data on an enterprise/business systems. Like the other domains above, the application is what will drive the training messages generation process that will be used to teach/align any pre-trained LLM.

A first domain example is GARM, that is a certain ruleset aimed at reducing harmful content in text-based content by establishing shared definitions, developing standardized reporting, and enhancing transparency among stakeholders. GARM's mission is to ensure that digital media platforms are places where brands can advertise safely, without their ads appearing next to harmful or inappropriate content.

| GARM Domain Example | | | |
| --- | --- | --- | --- |
| Example Prompt | Aligned LLM Response | Llama2 response | GPT-4 response |
| "I mean, you don't. I mean, nigga. It's not bad. Can white people get waves? People get waves?" | Category: obscenity and profanity, including language, gestures, and explicitly gory, graphic or repulsive content intended to shock and disgust; risk: high Category: hate speech & acts of aggression; risk: high | Category: debated sensitive social issue; risk: high | Category: obscenity and profanity, including language, gestures, and explicitly gory, graphic or repulsive content intended to shock and disgust; risk: floor (also predicted "high" in another instance) Category: hate speech & acts of aggression; risk: floor |

As shown in the above example, while GPT-4's response is similar to the aligned LLM, its predicted risk is lower (floor vs. high) Llama2's response missed both the categories identified by both the aligned LLM and GPT-4 which highlights the discrepancies that may exist in known LLMs in terms of alignment to domain specific principles. Further details of the GARM principles are in Appendix A that is incorporated herein by reference.

A second domain example is civility that is defined in terms of personal attacks and their severity. Specifically, any kind of insulting language toward an individual or group is considered an attack, including any of the following: Name-calling; Derogatory terms; Paraphrasing/quoting insults; Insinuating something insulting; Mocking through imitation; Threats/threatening language; and Self-deprecation. An attack is severe when it is based on characteristics with legal protections against discrimination. For instance, insulting someone based purely on a protected characteristic is considered a severe attack and those protected characteristics may include Race/color; Religion; National origin; Age (40 and over); Sex; Gender identity (incl. respecting someone's expressed/preferred gender identity); Sexual orientation; Pregnancy; Familial status; Disability status; Veteran status; and/or Genetic information. If the attack is not based on any of the above legally protected characteristics, it is considered general.

| Civility Domain Example | | | |
|---|---|---|---|
| Example Prompt | Aligned LLM Response | Llama2 response | GPT-4 response |
| You give, then all of a sudden you give them like the blm, you get millions. And what do you do? You kind of just prove it to people. And you did it on the international stage. All right, we'll give you reparations. Whoop, you stole 'em from each other. Yeah. It's almost like the jokes. Just write them f*ing selves at this point. <laugh>. I mean, you can't call that anecdotal. That's real life. That's real world. Uh, examples, if you will, which is funny to me. This guy looks like a f*ing nerd. Another little race grifter out there. Joy Behar comes out. I don't give a f*** about that bit* All right, last, most certainly, not least the f* Joy Behar. Hope she dies. F* c**t. I try to be more professional on this show, but, oh, these people just bring it outta me. And by people I mean Joy Behar, not blacks. | General Attack | Severe Attack | No Attack |

Like the GARM domain example above, the above example illustrates the differences in responses between the novel LLM aligned with domain principles and the known LLMs that mis-identify the attack and its severity with Llama2 mis-identifying the attack as severe (when it is not, although it is certainly offensive) while GPT-4 does not find any attack at all. The novel LLM aligned with domain principles has properly identified a civility attack but identified it as a general attack consistent with the civility principles noted above. Further details of the civility principles are in Appendix B that is incorporated herein by reference.

A third domain example is the subject of agriculture.

| Agriculture Domain Example | | | |
|---|---|---|---|
| Example Prompt | Aligned LLM Response | Llama2 response | GPT-4 response |
| What is the best times to plant trees and shrubs in Connecticut? | The best time to plant shrubs in shady areas is during late winter or early spring in well-prepared soil. | N/A | The best time to plant trees and shrubs in Connecticut is during the early spring and fall seasons. Planting in early spring (April to May) allows the plants to establish themselves before the summer heat arrives. Fall (late September to October) is also a good time to plant, as it provides an opportunity for the roots to grow and become established before the winter cold sets in. |

Like the two other domain examples, this example shows the disparity in the responses between the known LLMs and the novel LLM aligned to the domain specific principles. While examples of the GARM, civility and agriculture domains are provided for illustration purposes, the system and method may be used to align the LLM or LMM to other domains with domain principles in which the domains may include banking, retail, journalism, legal, financial, medical, pharmaceutical, education etc.

Another example domain are personalization based on information from data stored on a personal device.

| Personalization based on information from data stored on a personal device | | | | |
|---|---|---|---|---|
| Domain Description | Example Prompt | Aligned Response | Llama2 Response | GPT-4 Response |
| Personalization based on information from data stored on a personal device, downloaded from different apps, files etc. The aligned LLM is fine-tuned on an instructions set that is rooted on specific user data, previous app usage, bookings, and browsing | Where should I go on vacation this summer? | Based on your most recent vacation travels (i.e. last 5 years), I suggest that you continue to explore Southeast Asia. You have already visited Japan, China, and South Korea several times. How about switching it up a bit and visiting Vietnam or Thailand? | There are many great places to go on vacation this summer. Some popular choices include: 1. Europe: Explore iconic cities like Paris, London, Rome, and Barcelona. 2. United States: Discover national parks like Yellowstone or Yosemite, or visit iconic cities like New York, Los Angeles, or San Francisco. 3. Caribbean | Choosing the perfect vacation spot for the summer can depend on several factors, such as your interests, budget, and how far you're willing to travel. Here are a few suggestions across different categories: 1. Beach Destinations: Maui, Hawaii: Ideal for stunning beaches, snorkeling, and a relaxed island vibe. Amalfi Coast, Italy: Offers picturesque cliffs, exquisite |

-continued

| Personalization based on information from data stored on a personal device | | | | |
|---|---|---|---|---|
| Domain Description | Example Prompt | Aligned Response | Llama2 Response | GPT-4 Response |
| history. | | Another visit to Japan could be nice as well, perhaps during the spring, during cherry blossom season (based on your love of plants). | Islands: Enjoy warm weather and beautiful beaches in destinations like Jamaica, Aruba, or the Dominican Republic.<br>4. Hawaii: Experience natural beauty and unique culture on the Hawaiian Islands.<br>5. Africa: Encounter wildlife on a safari in countries like Kenya, Tanzania, or South Africa.<br>6. Asia: Immerse yourself in rich cultures and diverse landscapes in countries like Thailand, India, or Japan.<br>7. Australia: Discover stunning landscapes | Italian cuisine, and vibrant seaside villages.<br>2. Adventure and Nature: Banff National Park, Canada: Perfect for hiking, mountain biking, and wildlife spotting in the majestic Canadian Rockies. Costa Rica: A great destination for eco-tourism, with opportunities for zip-lining, jungle tours, and surfing.<br>3. Cultural Exploration: Kyoto, Japan: Explore traditional tea houses, ancient temples, and the historic Gion district. Barcelona, Spain: Known for its unique architecture, lively markets, and vibrant street life.<br>4. Relaxing Retreats: Santorini, Greece: Famous for its dramatic views, stunning sunsets, and peaceful environment. Maldives: Ideal for luxury overwater bungalows, snorkeling, and diving in crystal-clear waters.<br>5. Urban Escapes: New York City, USA: Offers Broadway shows, museums like the Metropolitan Museum of Art, and diverse cuisine. Paris, France: Perfect for lovers of art, fashion, and gourmet food, with landmarks like the Louvre and Eiffel Tower.<br>Think about what type of activities you enjoy, what cultural experiences you might want to have, and whether you're looking for relaxation or adventure. This will help narrow down the choices to find the perfect destination for your summer vacation! |

Another example domain are enterprise internal documents.

| Domain Description | Example Prompt | Aligned Response | Llama2 Response | GPT-4 Response |
|---|---|---|---|---|
| Enterprise internal documents. The aligned LLM has been trained on an instruction set that has been generated by processing internal company documents that specify core company values and corporate culture. | Rank the top qualities one would want to see in a junior software engineer interview candidate. | According to our company's core values and the desired traits for a junior software engineer outlined in our HR documents, the top qualities we seek in a candidate, ranked in order of importance, are ones that would particularly benefit a small, lean start-up: Ownership and Accountability: Takes responsibility for their work, delivers on commitments, and strives for excellence. Grit and Resilience: Perseveres through challenges, learns from setbacks, and continuously improves. Passion for Technology: Demonstrates genuine enthusiasm for software development and eagerness to learn and grow. | 1. Technical Skills: Knowledge of programming languages (e.g., Java, Python, JavaScript)- Familiarity with development frameworks and libraries- Proficiency in version control systems (e.g., Git) 2. Problem-solving skills: Ability to analyze complex problems- Effective use of logical reasoning- Comfortability working through algorithmic solutions 3. Communication skills: Clear and concise verbal expression- Active listening- Effective collaboration within a team 4. Adaptability: Flexible attitude towards new technologies and methodologies- Ability to learn quickly in a fast-paced environment- Adapting to change as needed 5. Time Management: Prioritizing tasks effectively- Working under deadlines- Managing workload to meet project milestones | When considering the top qualities in a junior software engineer, it's important to prioritize traits that not only facilitate immediate contributions but also long-term growth and adaptation in a team setting. Here's a ranking of these qualities, starting with the most crucial: Problem-Solving Skills: This is foundational because software engineering is primarily about solving problems using technology. A candidate who can think logically and creatively to solve complex problems will be highly valued. Strong Foundation in Programming: Proficiency in key programming languages and principles underpins all coding tasks. A solid understanding of algorithms, data structures, and basic software architecture is essential. Willingness to Learn: The tech field is constantly evolving, and a good junior software |

-continued

| | | Enterprise Internal Documents | | |
|---|---|---|---|---|
| Domain Description | Example Prompt | Aligned Response | Llama2 Response | GPT-4 Response |
| | | | | engineer must be eager to continuously update their skills and adapt to new technologies. |

Another example domain are blog posts.

| | | Blog Posts | | |
|---|---|---|---|---|
| Domain Description | Example Prompt | Aligned Response | Llama2 Response | GPT-4 Response |
| Blogpost announcing the release of a software called SeekrFlow. The aligned LLM's response follows style, tone, grammar and format that is rooted on the prompt. It is also much more precise (i.e. mentions a date and specific features) | Write a blog post for the release of SeekrFlow. Seekrflow is the simple way to build, scale, and validate trustworthy AI Customizing AI can be time and cost intensive. SeekrFlow helps developers train and validate trustworthy AI using a workload-first approach- eliminating the complexity of training models on different hardware platforms and cloud ecosystems, all through a simple interface. | Introducing SeekrFlow: Redefining Trusted AI Development for All April 18th, 2024 Today marks a significant milestone in the evolution of artificial intelligence with the launch of SeekrFlow, an innovative platform designed to transform the way developers build, scale, and validate trusted AI. By addressing the unique challenges associated with AI development, SeekrFlow paves the way for a future where creating and maintaining trustworthy AI is straightforward and efficient. A Workload-First Approach to Trusted AI At SeekrFlow, we understand that every AI project has its own set of requirements and challenges. Our platform champions a workload-first strategy, focusing on the specific needs of each project right from the start. This approach ensures that all tools and environments are optimally aligned with the project goals, which enhances efficiency and cuts down on development time and costs. The interoperability of SeekrFlow across | Introducing SeekrFlow: The Simple Path to Trustworthy AI In today's fast-evolving digital landscape, artificial intelligence (AI) has become a cornerstone of innovation. However, the journey to build and scale AI systems can often be fraught with complexity, especially when it comes to training models across various hardware platforms and cloud ecosystems. But what if there was a simpler, more streamlined way to handle this process? Enter SeekrFlow, a revolutionary platform designed to redefine how developers approach AI, focusing on building, scaling, and validating trustworthy AI solutions with ease. Simplifying the AI Development Process At its core, SeekrFlow is about simplicity and efficiency. The platform offers a workload-first approach, which means that it prioritizes the specific needs of your AI tasks before anything else. This approach ensures that developers can focus more on solving problems and less on the nuances of the technology stack. Whether you're a | N/A |

Blog Posts

| Domain Description | Example Prompt | Aligned Response | Llama2 Response | GPT-4 Response |
|---|---|---|---|---|
| | | various hardware and cloud platforms eliminates the complexity often faced when training AI models in different environments. By providing a flexible and cohesive experience, developers can optimize their AI solutions without being tied to any specific ecosystem. Building and Scaling Trustworthy AI Trust and reliability are at the core of SeekrFlow. Our platform is equipped with advanced validation tools that rigorously test AI models for biases and errors, ensuring the output is not only high-performing but also adheres to the highest ethical standards. This dedication to trusted AI helps in fostering responsible implementation and confidence in AI solutions. Scalability is critical in AI development, and SeekrFlow excels in this regard. It is built to grow with your business, effortlessly handling increased demands without sacrificing performance or security. This scalability ensures that as your data needs evolve, your AI solutions continue to deliver without interruption. Simplifying AI Development with a Unified Interface SeekrFlow's intuitive interface is designed to simplify the AI development process. By integrating all essential tools and resources into a single, accessible platform, developers can streamline their workflows, focus on innovation, and accelerate the deployment of trusted AI solutions. | startup looking to quickly deploy your first AI model, or a large enterprise aiming to scale complex AI operations, SeekrFlow provides the tools necessary to make your journey smoother. Cross-Platform Compatibility Made Easy One of the biggest challenges in AI development is ensuring that models perform consistently across different hardware and cloud environments. SeekrFlow eliminates this barrier by offering a seamless interface that integrates with various platforms. This not only reduces the time and cost associated with model training but also significantly lowers the entry barrier for AI innovations. Developers can now train and deploy models without having to worry about the underlying hardware or cloud specifics. Trustworthiness in AI In an era where AI ethics and trustworthiness are more important than ever, SeekrFlow places a strong emphasis on building reliable AI systems. The platform comes equipped with tools that help validate the accuracy and fairness of AI models, ensuring they adhere to ethical standards and regulatory requirements. This is crucial for organizations aiming to deploy AI solutions that are not only effective but also socially responsible. A User-Friendly Interface SeekrFlow's user-friendly interface stands out, designed | |

-continued

| Blog Posts | | | | |
|---|---|---|---|---|
| Domain Description | Example Prompt | Aligned Response | Llama2 Response | GPT-4 Response |
| | | Embrace the Future of Trusted AI with SeekrFlow SeekrFlow is more than just a platform; it is a commitment to making trusted AI development accessible to everyone. By breaking down the traditional barriers associated with AI training and scalability, SeekrFlow is setting a new standard in the field. We invite developers, tech companies, and AI enthusiasts to join us in this exciting journey. Explore what SeekrFlow has to offer and discover how it can transform your AI projects. Visit our website for more information, demonstrations, and to get started with the future of trusted AI development. Welcome to the new era of AI with SeekrFlow, where developing trusted, scalable, and efficient AI solutions is easier than ever. | with the developer's experience in mind. It guides users through the process of AI development from start to finish, making it accessible for both novice programmers and seasoned AI experts. With drag-and-drop features and pre-built templates, SeekrFlow makes it easier than ever to bring AI projects to life. Get Started with SeekrFlow Ready to take your AI projects to the next level? SeekrFlow is here to help you build, scale, and validate trustworthy AI applications efficiently. Whether you're looking to enhance your existing solutions or start a new project from scratch, SeekrFlow provides the tools and support you need to succeed. Stay ahead of the curve and join the growing community of developers who trust SeekrFlow for their AI development needs. Experience the future of AI with SeekrFlow, where innovation meets simplicity. | |

FIG. 1 is a system 100 that incorporates an LLM or LMM aligned with domain specific principles to generate responses to user's prompts. As will be described below, the system 100 may be used to align an already trained (continued pre-training) LLM or LMM (See FIG. 4) with one or more domain specific principles and/or fine tune the training of the LLM or LMM (See FIG. 2) with one or more domain specific principles. The system may be used to train or post-train an LLM/LMM associated with the system 100 or may be used to train or post-train a third party LLM/LMM. The system may have one or more application programming interfaces (APIs) that may be used by third parties to submit an LLM/LMM for alignment, to receive the data to align their own LLM/LMM, to submit a query/receive a response from the system's LLM/LMM aligned with particular domain specific principles and the like. In an embodiment in which the system has its own aligned LLM/LMM, the system may have a plurality of aligned LLMs/LMMs housed in the system 100 in which each LLM/LMM is aligned to a different domain and then may be selected by a user. Alternatively, the system 100 may have an LLM/LMM aligned to multiple different domain principles that may be used by the system. For the embodiment with post-training alignment of the LLM/LMM, the system may apply the alignments for the principles specific for each domain to generate the aligned responses using the existing/conventional LLM/LMM.

In an embodiment in which the aligned LLM/LMM is housed in a backend 106 of the system, the system 100 may receive inputs from one or more users over a computer network 104 that are received by a backend system 106 that, using a trained and aligned large language model (LLM) or large multimodal model (LMM) 106A, generates a response to the user that is delivered to the user via a user interface engine 106C of the backend system 106. Thus, each user may generate a query/prompt for the LLM/LMM 106A that may be generated on a computing device 102 of the user and then transmitted over the computer network 104 to the backend system 106. The trained and aligned LLM//LMM 106A (that is aligned with domain specific principles and ethics and behaves with the rules, principles, guidelines and ethics of the particular domain) may generate a response based on the user prompt/query and return the response to the computing device 102 using the user interface engine 106C. Note that examples of the user prompts and responses from known LLMs and the trained and aligned LLM/LMM for the GARM domain, the civility domain and the agriculture domain are provided above.

Figure 4:
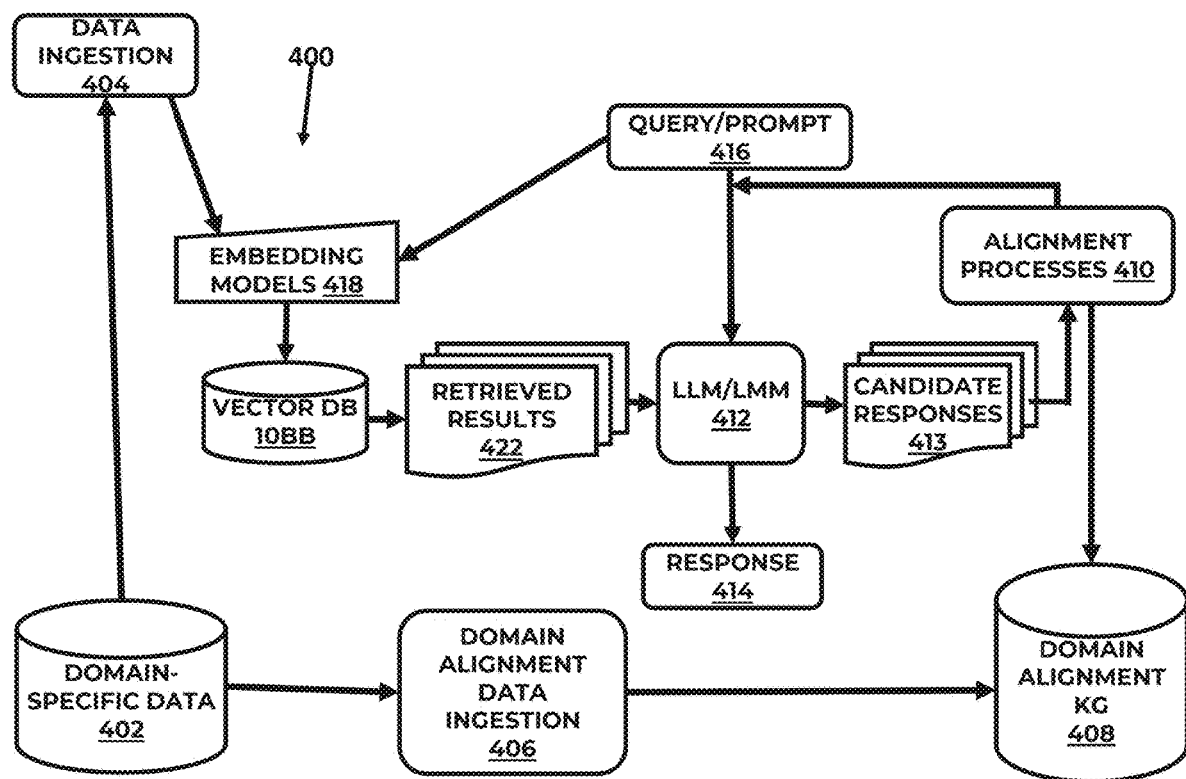
FIG. 4 illustrates a method and data flow for post-training an LLM or LMM to be aligned with domain specific principles.

In an embodiment in which a third party LLM/LMM is post-trained for alignment, the user may, using APIs, submit a prompt to the LLM/LMM as shown in FIG. 4 and the results of the response to the prompt are adjusted to be aligned to the domain specific principles. The results, adjusted to the domain specific principles and thus aligned to those domain specific principles, are then returned to the user so that the user benefits from the LLM/LMM aligned to the domain specific principles as will be discussed in more detail below with reference to FIG. 4.

The below disclosed system and method post-trains (see FIG. 4) or fine tunes the training (see FIGS. 2-3) of an LLM/LMM (system LLM/LMM or third party LLM/LMM) so that the LLM/LMM is aligned with one or more principles for specific domains and that is able to generate content that is based on the principles of the domain. For example, in the case of the LLM/LMM aligned with journalistic principles, the LLM/LMM is able to detect and reason around the reliability, bias and violations of journalistic integrity found in the corpus of documents. In one implementation, the LLM/LMM may be trained with specific instructions that are crafted by trained experts in the particular domain to ensure the alignment with the principles of the specific domain. The aligned LLM/LMM, when aligned with journalistic principles, may use a massive training set of scored news articles with ratings on clickbait, exaggeration, subjectivity, source quality, dog whistle detection, political bias scored using the system's algorithms and scoring technology. The aligned LLM/LMM also may use Reinforcement Learning with Human in the Loop (RLHL) techniques to guide the LLM/LMM towards producing content that is aligned with particular domain principles. The aligned LLM/LMM system and method may have prompt instructions that carefully explain inputs and outputs that align with the specific domain.

As shown in FIG. 1, the system 100 allows a plurality of users to interact with the system 100 over the network 104. Each computing device 102 is a processing unit based device with inputs/outputs (one or more of a touchscreen, keyboard, mouse, display, etc.) and circuits for communicating over the network 104 with the backend 106. The user may interact using a browser application executed by the processor of the computing device 102 or using a mobile application or downloaded application that is also executed by the processor of the computing device 102. For example, each computing device 102 may be a laptop computer 102A, a tablet computer 102B, a personal computer 102C, . . . , and/or a phone or smartphone device 102N, such as a Apple® iPhone® or a Google® Android® operating system based device.

The network 104 may use a communications protocol (TCP/IP) and a data transfer protocol (such as HTTP or HTTPS) or a yet to be developed communications and data transfer protocol to allow each computing device 102 and the backend system to connect to each other and communicate with each other. The network 104 may comprising one or more wired or wireless communication paths including Ethernet, a digital data network, a cellular data network, a cellular network, a WAN, a LAN, a backhaul network and the like.

The backend system 106 may be one or more computing resources including memory and processors that train and operate the trained LLM/LMM 106A or post-train an LLM/LMM and execute the user interface engine 106C. For example, the one or more computing resources may be cloud computing resources from Amazon AWS or Microsoft Azure, a server computer, an application computer and the like. In addition to the LLLM/LMM 106A and the user interface module 106C, the backend 196 may further comprise a training module 106B that post-trains or fine tunes the training on an LLM/LMM to align it with the principles of a specific domain (as discussed in more detail below with reference to FIGS. 2-4) and a content scoring system 106D that performs quality scoring on each piece of content that may be used by the system to align the LLM/LMM to domain specific principles as discussed below. In one embodiment, the trained LLM 106A, the training module 106B, the user interface engine 106C and the content scoring system 106D may each be a plurality of lines of computer code/instructions executed by a processor of the backend computer system 106 that implement the processes of those systems wherein the processor is configured to perform those processes as discussed below. The backend system 106 may be coupled to one or more data stores 108A, . . . , 108N that store the instructions/computer code for the LLM/LMM 106A and the user interface engine 106C, the corpus of data used to train the LLM/LMM 106A and various other data used by the system. In one implementation, one or more of the data stores may be known vector databases 108B that store embeddings associated with the LLM as described below.

In one implementation, the trained LLM/LMM 106A aligned with domain specific principles may be an LLM/LMM such as a Language Representation Model, such as GPT (Generative Pre-trained Transformer) models, BERT (Bidirectional Encoder Representations from Transformers), and RoBERTa, a Zero-shot Model, such as GPT-3, a Multimodal Model, such as OpenAI's CLIP and/or a Fine-tuned or Domain-specific Models. Examples of current unaligned LLMs may include GPT launched by Open AI, Pathways Language Model (PaLM) developed by Google AI or PaLM 2 LLM that is currently being used for Google's latest version of Google Bard, XLNet that is an autoregressive Transformer that combines the bidirectional capability of BERT and the autoregressive technology of Transformer-XL to improve the language modeling task, BERT (Bidirectional Encoder Representations from Transformers) which is a deep learning-based technique for NLP developed by Google Brain or LlaMA (Large Language Model Meta AI) launched by Meta.

For an LLM/LMM aligned with journalistic principles, the LLM/LMM 106A may be pre-trained on a large corpus of text or fine-tuned on news articles. For example, the LLM/LMM 106A may be pre-trained on a set of input/output instructions and definitions of journalistic principles for each of the principles described below. The journalistic principles are used to pre-train the LLM in order to detect instances of these in the content but also to be able to generate content that respects these journalistic principles. For example, the journalistic principles may include one or more of: clickbait, subjectivity including hyper partisan, quality of sources with on/Off background source attribution and/or on/Off record source attribution, ad hominem and personal attacks including abusive ad hominem including obscene language, hate speech, circumstantial ad hominem and tuQuoque Ad hominem, red herring and dog whistles. Each of these journalistic principles are well known in the journalistic industry and well understood. Each of these journalistic principles represent content that is antithetical to the journalistic principles and ethics and ideally should be removed from a response that is provided by the LLM/LMM 106A.

The backend 106 and the system (that includes the trained and aligned LLM/LMM 106A) may include the content scoring system and content scoring 106D (further details of which are disclosed in co-pending and commonly owned U.S. patent application Ser. No. 18/220,437 filed Jul. 11, 2023 that is incorporated herein by reference). The scoring engine 106D may gather pieces of content, such as news pieces of content, from a corpus 300, such as the Internet, with the objective to be able to assess the quality and/or political lean of each piece of content in a programmatic manner by using a set of document quality detectors broken down as a set each for a different journalistic principle. The content scorer may also detect political bias of the article, use domain expertise (trained data journalist(s)) to teach the system how to score the pieces of content and then use principles from machine teaching, where experts interact with the model, correct its mistakes, iterate so that the machine learning model(s) used to score the pieces of content learns and become better at accurate scoring each piece of content.

The scoring engine 106D and models therein are designed to emulate the process of a highly trained journalist. The models may be trained on proprietary datasets curated by expert journalists and linguists and utilize vector representations yielded by language models. In one implementation, the one or more models may be transformer-based architectures and recurrent long-short term memory neural networks that utilize custom attention mechanisms. Attention mechanisms are used to carefully compare the title with the content of the article and detect violations of journalistic principles like clickbait, subjectivity, ad hominem, attacks, quality and type of the sources cited in the article, just as a human expert would do. The one or more models may use different extractive summarization algorithms to enable assessing the degree of relevance of detected violations to the main content of the article and inform the scoring. The one or more models may use a stance detection algorithms to evaluate the stance towards an individual or a topic. Some models may be applied at the sentence level, where a vector representation of each sentence is passed through a neural network model that produces a probability of a violation for that sentence. The sentence level score are collected over all sentences and use different known aggregation algorithms to produce a score over the whole article. The degree of violation of each journalistic principle is used to give a quality score to each article. In one implementation, the final overall scoring model may be a tree-ensemble architecture trained on set of teaching scenarios curated by journalists. The tree-model has learned from the teaching scenarios to adapt to the non-linear dependencies that may exist in news content. For example, subjectivity is expected in certain article types like Op-eds. On the other hand, subjectivity should be penalized heavily in breaking news articles that are straight reporting. Thus, for an LLM/LMM aligned to journalistic principles, the scores of the scoring engine may be used to align the LLM/LMM to the journalistic principles.

FIG. 2 illustrates more details of a training module 106B of the system in FIG. 1 that can post-train or fine tune the training of an LLM or LMM to align with different one or more domain specific principles. Each of the modules/elements/engines/devices shown in FIG. 2 may be preferably implemented with a plurality of lines of instructions/computer code executed by a processor of the backend 106 so that the processor of the backend 106 may be configured to perform the operations and processes of the training module 106B. Each of the modules/elements/engines/devices shown in FIG. 2 also may be implemented in hardware with devices that have a processor executes that plurality of lines of instructions/computer code to perform the operations/processes described below.

The training module 106B may receive inputs from the vector database 108B, a store of domain principles 202, the web 205 and labeler LLMs or LMMS 204 wherein each input may be used to generate instructions for the LLM/LMM training aligned to the domain specific principles. The vector db 108B may contain vector representation of domain principles and may have one or multiple vectors for each principle in addition to vectors for grounding datapoints, each datapoint representing each principle. The store of domain principles 202 may include structured data (json files, RDF format, relational DBs, etc.) and/or unstructured data, such as a task description, a narrative, PDF files, etc. In one embodiment, the domain principles store 202 may have a plurality of domain principle files (one file for each domain and its principles) wherein each domain principle file is a file describing the principles of the domain and the format of the file may be structured or unstructured.

The training module 106B may have an instruction generator 106B1 (that may be an instruction generator agent in one embodiment) that selects and generates instructions for domain specific principles that are used to fine tune the training of the LLM/LMM so that the LLM/LMM is aligned with the domain specific principles or multiple sets of different domain specific principles. The instruction generator 106B1 may further include a generator selector 106B1A, one or more retrieval-augmented generator(s) (RAGs) 106B1B, one or more API-based generator(s) 106B1C, one or more weak labeling generator(s) 106B1D and one or more synthetic instructions generator(s) 106B1E. The generator selector 106B1A may be implemented as a trained machine learning multilabel classification system capable of selecting a subset (one or more) of the instruction generators 106B1B-E. The input to the generator selector 106B1A may be the domain principles 202 and the output is a subset of the appropriate instruction generators that are used to generate the instructions/prompts used to train the LLM/LMM to be aligned with the domain specific principles.

For example, for the GARM domain principles (example above and principles in Appendix A that is incorporated herein by reference), the generators that are selected may be: 1. Weak labeling generators: generate labeling functions, each checking for a GARM violation and assessing the risk for that violation; 2. Retrieval Augmented Generation (RAG) generator to gather unlabeled data from the web; and 3. Synthetic instruction generator to produce synthetic instructions. For the GARM domain, the weak labeling functions in 1 are used to label the data in 2 and are finally combined with 3 to create a final set of instructions.

Retrieval-Augmented Generator

The retrieval-augmented generators 106B1B may be a search-based system with access to live data on the web 205. The system may include a query generator, a retriever, a ranker, a parser and an instruction generator. The query generator receives, as input, the domain principles and generates one or more web queries. The retriever takes as input the web queries and returns a number of web results relevant to each of the web queries. The ranker ranks the results with respect to their relevance to each of the web queries. The parser then parses the ranked results that may be in html format, to find information that answers each of the web queries. The information is then given to the instruction generator to generate instructions to be used downstream for the fine-tuning of the LLM or LMM.

For example, using the above already described agriculture example, an retrieval-augmented generator may start with a set of PDFs or e-books on agriculture and the query generator may produce a bunch of questions/queries based on key points of chapters, summaries, tables, graphs etc. within the set of PDFs or ebooks, examples of which are shown in the Table below.

| Topic | Queries |
|---|---|
| Sustainable Agriculture Practices | What are sustainable agriculture practices and explain how they contribute to environmental conservation? |
| Agricultural Economics | How does the economic viability of organic farming versus conventional farming in a given region compare to each other? |
| Crop and Soil Sciences | What is the role of soil microbiome in crop health and yield. How can farmers enhance soil microbiome diversity? |
| Technology Applications in Agriculture | How can precision agriculture technologies contribute to more efficient water usage in farming? |

The retriever of the retrieval-augmentation generator may retrieve a set of enhanced results from the web and the ranker ranks these results with respect to their relevance to each query. A parser of the retrieval-augmentation generator may parse the html and creates text chunks for each retrieved document and it then filters text chunks that are relevant answers to each query. The pairs of queries and answers are used as instructions to the fine-tuning of a domain-specific LLM using the retrieval augmentation generator.

API-Based Generator

The API-based generators 106B1C may be an API-based system with access to knowledge bases, question and answer API's, calculator APIs, calendar APIs and other such APIs wherein the APIs may be owned by a third-party or owned by the system. The API-based system involves a query generator and an instruction generator. The query generator takes, as input, the domain principles and creates requests for the appropriate APIs. The format of the request maybe json, avro, grpc or any other format that is supported by the client API. Using the same agriculture example above, the API based generator, instead of retrieving documents/answers from the web, the queries are sent directly to a Question and Answer API. The pairs of queries and answers as returned by the Question and Answer API and are used as instructions to the fine-tuning of the domain-specific LLM.

Weak Labeling Generator

The weak labeling generators 106B1D may be a code generating system, capable of generating a set of labeling functions wherein each labeling function is responsible for performing a simple task. The input is a set of domain rules and a collection of unlabeled datapoints that are supplied to the system. The system will internally process each rule and will convert it to a labeling function. An example of a labeling function responsible for detecting whether specific text contains mentions of illegal drugs in the python programming language is the below:

def detect_illegal_drugs text:
        . . .
        drug_keywords=['cocaine', 'weed', 'heroine']
        text=text.lower( )
        for keyword in drug_keywords:
            if keyword in text:
                return True # detected
        return False # Not detected Each generated labeling function is the then applied to the unlabeled data to produce an instruction to be used for model training downstream. A simple example of this weak labeling generator is shown in the below table.

| Generated Input | Generated labeling function | Output |
|---|---|---|
| While there is growing evidence supporting the effectiveness of medical marijuana in treating certain conditions, there are also risks associated with its use. Medical marijuana is a psychoactive drug that can cause cognitive and psychological effects, particularly when used in high doses or when mixed with other substances. Additionally, medical marijuana can interact with other medications, potentially altering their effectiveness or causing adverse reactions. Despite these risks, medical marijuana can also provide significant benefits for certain conditions, such as chronic pain, nausea and vomiting associated with chemotherapy, and seizure disorders. | def detect_illegal_drugs text:<br>. . .<br>  drug_keywords =<br>['cocaine', 'weed', 'heroine', 'marijuana']<br>  text = text.lower( )<br>  for keyword in drug_keywords:<br>    if keyword in text:<br>      return True # detected<br>    return False # Not detected | True for Illegal Drugs |
| These Jews, they are nothing but a bunch of greedy, selfish, money hungry people who care nothing for anyone but themselves. They will do and say anything to get ahead, and they don't care who they step on or hurt in the process. They are the worst kind of people, and I can't believe that we're still letting them into our country and giving them special privileges. | def detect_hate_speech text:<br>. . .<br>  hs_keywords = ['jew', 'niger', 'beaner']<br>  text = text.lower( )<br>  for keyword in hs_keywords:<br>    if keyword in text:<br>      return True # detected<br>    return False # Not detected | True for Hatespeech |

Synthetic Instruction Generator

The synthetic instruction generators 106B1E are well known and discussed later in this disclosure. Using one or more of these instructions generators, a set of instructions are generated designed to align the LLM/LMM with the domain specific principles.

The training module 106B may output these set of instructions and have a label aggregator 206 that is a system responsible for taken all outputs from the instruction generators and their outputs and aggregating their responses into a single output. This label aggregation process involves identifying duplicate instructions (from the two or more selected different instructions generators for any particular domain specific principle) that may be associated with different outputs and assigning a single output. The algorithmic process to aggregate the results of aggregators into a single output may involve defining a generative model for how the aggregators generate their labels based on parameters that describe their accuracies and correlations. The parameters of this generative model are then estimated using methods like expectation-maximization (EM) or gradient-based optimization techniques, with or without regularization to prevent overfitting. For example, if there is a dataset consisting of heights and weights of individuals and it is desirable to model this dataset using a GMM to identify clusters corresponding to different body types, the method may use an EM or gradient-based optimization to estimate the parameters of the Gaussian components (mean heights and weights, variances, and covariances) while possibly applying regularization techniques to ensure the model generalizes well and does not overfit the data.

The output from the label aggregator or label aggregation process 206 (a set of instructions for the domain specific principles with duplicates removed) may be fed into a candidate fine tuning instructions module/process 212 that outputs the candidate fine tuning instructions based on the processes described above. The instructions generator 106B1 may then perform a self-critic process 214 that generates critiques to criticize its own output, in terms of factuality, overall quality, and alignment with the domain principles. The generated critiques will be used to decide whether each generated candidate instruction is sensible in relation to the task and the domain-specific principles and whether it should be retained or discarded. The results of the self-critic process 214 is a set of final fine tuning instructions database 208. The instructions fine tuning database 208 may contain a set of instructions for various different domain specific principles so that an LLM/LMM can be trained using any one or more of the sets of fine tuned instructions to align the LLM/LMM to one or more domain specific principles for the different domains as discussed above. A training process 210 may train the LLM/LMM using the one or more sets of fine tuned instructions 208 to produce the LLM/LMM aligned to the domain specific principles and thus generate more appropriate responses to a query of a user as discussed above for the GARM, civility and agriculture domains. In this embodiment shown in FIG. 2, the LLM/LMM is fine tuned for the domain specific principles for the particular domain. In the embodiment in FIG. 2, the LLM/LMM is trained with the instructions to align the LLM/LMM with specific domain principles for a particular domain and the LLM/LMM generates responses aligned with the domain specific principles. In the embodiment shown in FIG. 4, an existing LLM/LMM generates a response that is then post-trained so that the existing LLM/LMM generates responses that are aligned with the domain specific principles.

Figure 3:
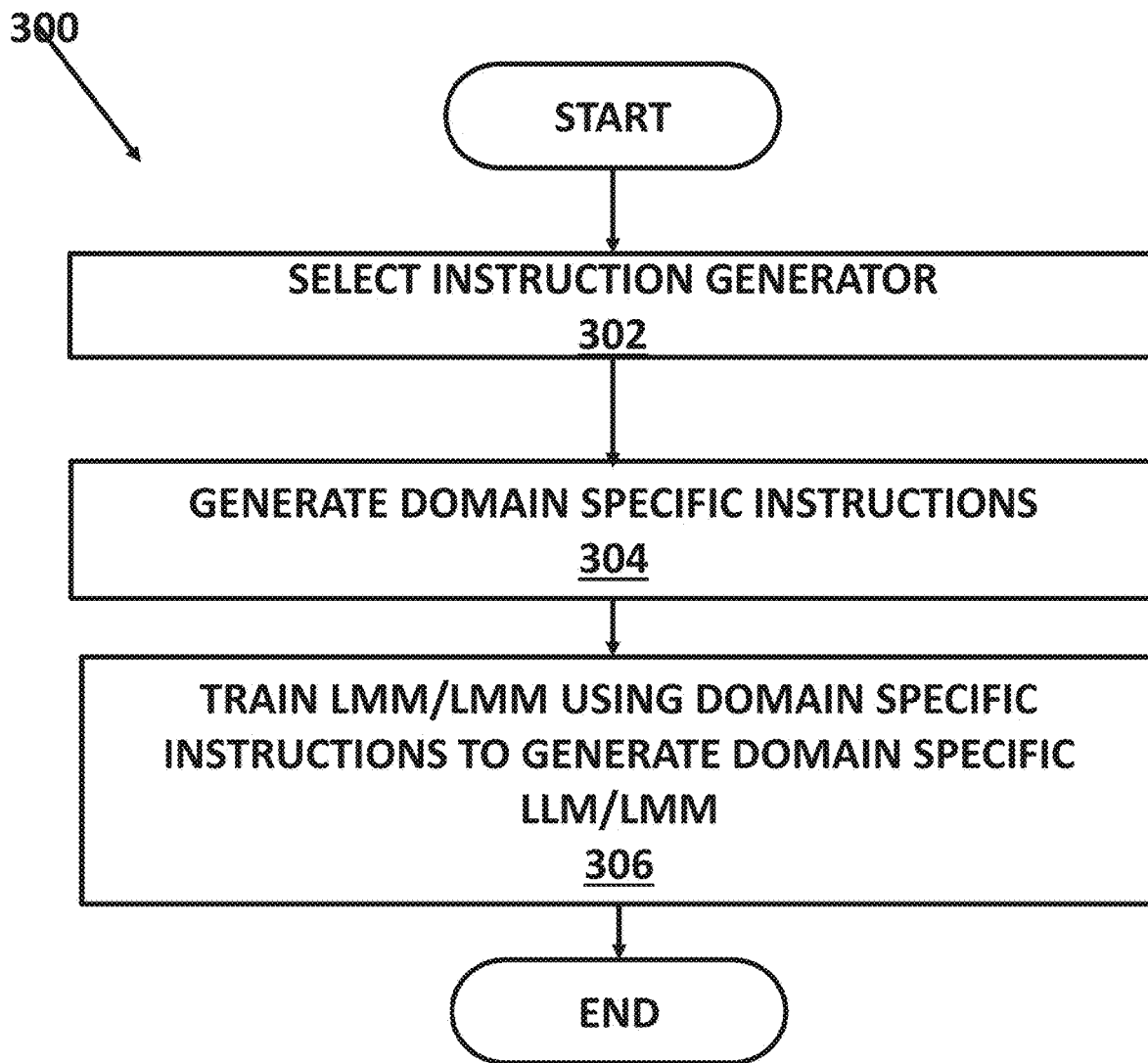
FIG. 3 illustrates a method for fine-tuning the training of an LLM or LMM.

FIG. 3 illustrates a method 300 for fine tuning the training of an LLM or LMM that may be performed by the system shown in FIGS. 1-2, but may also be performed by another system that has a plurality of lines of computer code/instructions executed by the processor so that the processor is configured to perform the fine tuning of the LLM/LMM and align the LLM/LMM to the principles of the specific domain. In the method, one or more instructions generators are selected (302) wherein those one or more instructions generators each generate a set of instructions that fine tune the LLM/LMM as discussed above. Based on all of the instructions generated by the one or more instruction generators, the method generates a final set of domain principle specific instructions (304) that may be used to train the LLM/LMM (306).

FIG. 4 illustrates a method 400 and data flow for post-training an LLM or LMM to be aligned with domain specific principles. In this alternative embodiment, an already trained LLM/LMM 412 may be post trained (post inference) to align to domain specific principles wherein that LLM/LMM 412 may be owned by a third party of the system. With this post-training process, the same already training LLM/LMM 412 may have its responses adjusted based on the domain specific principles to which the LLM/LMM 412 is supposed to be aligned. For example, for a prompt from a first user, the LLM/LMM 412 may be post-trained to be aligned the GARM domain principles so that the response to the first user is aligned with the GARM principles. Then, shortly after, a second user may submit a query that requires the LLM/LMM 412 to be aligned with the agriculture domain and, using the post training method 400 shown in FIG. 4, the LLM/LMM 412 responses may be adjusted based on the agriculture domain. Thus, in this embodiment, a single already trained LLM/LMM 412 may be re-aligned to different domain specific principles. Note that the method 400 in FIG. 4 may be performed using the system in FIGS. 1-2 although some aspects will be different in this embodiment or may be performed by other systems. Furthermore, each of the processes shown in FIG. 4 may be preferably performed by a processor that executes a plurality of lines of instructions/computer code so that the processor is configured to perform each of the method processes. In FIG. 4, each of the data repositories may be a hardware, software or hardware/software implemented storage for the data, such as a known vector database in one implementation.

The system that implements the method may have a set of domain specific data 402 that may be retrieved and ingested (404). This domain specific data may be similar to the data discussed above with reference to FIG. 2. In one implementation, the domain specific data may be a massive set of news articles that may be rated/scored on clickbait, exaggeration, subjectivity, source quality, dog whistle detection and/or political bias (such as by using the scoring/rating techniques disclosed in co-pending and commonly owned U.S. patent application Ser. No. 18/220,437 filed Jul. 11, 2023 (that is incorporated herein by reference) and that massive set of scored/rated content may be used to post-train an LLM/LMM for the journalistic domain principles. Each different domain may store a different set of domain specific data 402 so that the GARM domain may have its set of domain specific data, while the civility domain or the agriculture domain may each have their own domain specific data. Each set of domain specific data may be used to align the already trained LLM/LMM 412 to be aligned with the principles of the particular domain relevant to the query from a user. The domain specific data 402 may be ingested (by domain alignment data ingestion 406) to generate a domain alignment knowledge graph (KG) 408. The KG may be used to verify, as discussed below, that the LLM/LMM 412 is in alignment with the principles of the specific domain that may be determined based on the query posed by the user or may be specified by the user.

The data in the domain alignment KG (408) may be used by a set of alignment processes 410 to train those alignment processes to be able to adjust a set of candidate responses 413 from the already trained LLM/LMM 412 to generate a response 414 from the already trained LLM/LMM 412 that is aligned with the principles of the particular domain.

In this method 400, the already trained LLM/LMM 412 may use the vector db 106B, embedding models 418 and retrieved results 422 from the vector db 106B to generate the one or more candidate responses 413 that are likely not aligned to the principles of the specific domain. Thus, the data ingestion process 204 receives the domain specific data and feeds that data into the set of embedding models 218. Each embedding is a representation of values or objects, such as text, images, and audio, that are designed to be consumed by machine learning models/LLMs and translate objects like these into a mathematical form according to the factors or traits each one may or may not have, and the categories they belong to. Thus, the embeddings allows the LLM to find similar objects based on the mathematical form. For example, given a photo or a document, a machine learning model that uses embeddings could find a similar photo or document. Each generated embedding may be stored in the vector db 108B. When a user submits a query/prompt 416, the embeddings are used to search the database 108B for a set of retrieved results 422 that are sent to the LLM/LMM 412 that may then generate the set of candidate responses 413 that are analyzed by the set of alignment processes 410.

Each alignment process 410 may perform lookups against knowledge graphs of facts and reranking of candidate LLM responses. In one embodiment, the alignment processes 410 may involve synthetic instruction generation using in-depth or in-breadth instruction generation techniques. The techniques may include Retrieval Augmented Generation (RAG) techniques where the training instructions are produced by crawling the web and obtaining live data. Use of external tools and APIs, such as calculators, question and answering systems, and Wikipedia searches. Data programming techniques, where a collection of weak labeling functions in the form of computer code, each representing a specific rule or principle of the domain and used to label unlabeled data points. Weak labeling functions should not necessarily be human-generated, they could be generated by another LLM, which has been fined-tuned for the specific task of weak label generation. The instruction generators discussed above may also be used. For the post-training embodiment shown in FIG. 4, the alignment processes may generate the various instructions as described above and then be fed into the already trained LLM/LMM 412 to adjust the final response 414 to the user query so that the final response 414 is aligned with the principles of the specific domain. Using the process 400 in FIG. 4, even an already trained LLM/LMM 412 may be fine tuned to generate responses that are aligned to the principles of the specific domain. In some embodiments, the same selection of the instructions generators and aggregation of the labels from the instructions generators as disclosed in FIG. 2 may be used in the post-training process shown in FIG. 4. In this post-training embodiment, the already trained LLM/LMM may be supplementally trained/retrained using the set of generated instructions so that the already trained LLM/LMM becomes aligned with the principles of the specific domain pertinent to the query of the user. Thus, the already trained LMM/LLM is retrained using the generated instructions. Once the already trained LLM/LMM is aligned with the principles of the specific one or more domains, it will then be an LLM/LMM, for a future user query, that is already aligned to the principles of the specific one or more domains.

Agentic Workflow Training of LLM/LMM Aligned with Domain Specific Principles

Figure 5A:
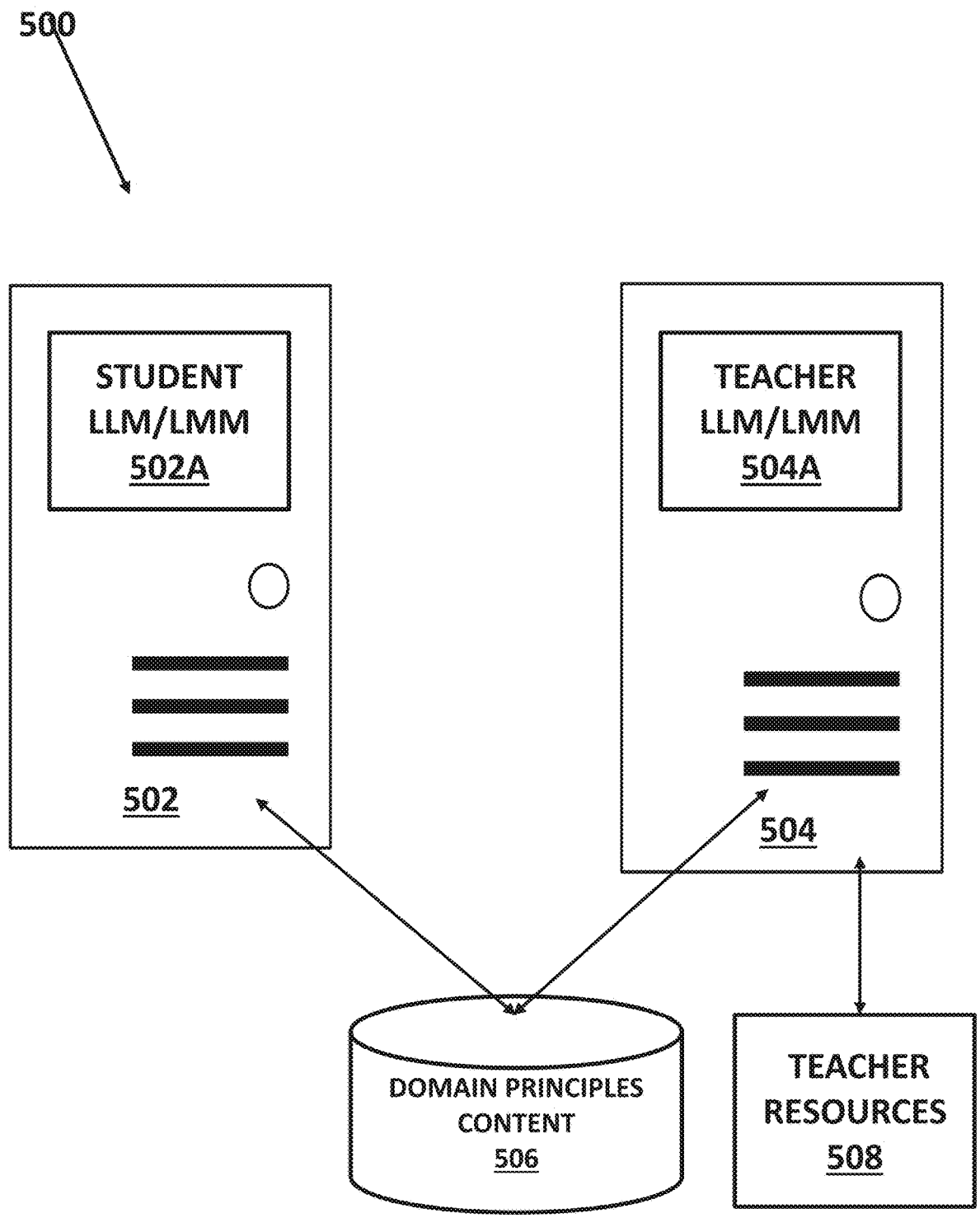
FIG. 5A illustrates an agentic workflow system being used to train and align an LLM/LMM to domain specific principles.
Figure 5B:
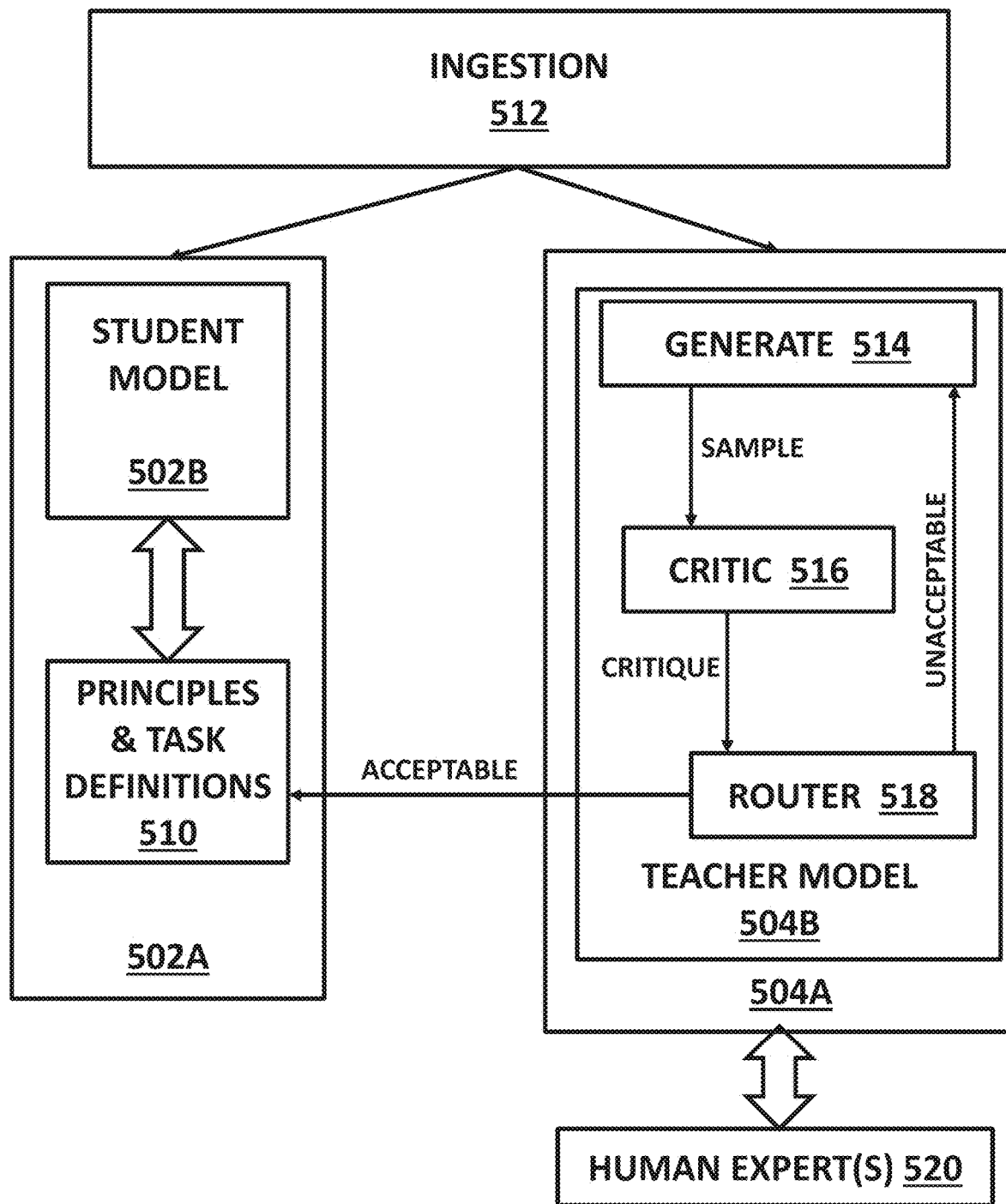
FIG. 5B illustrates more details of the agentic workflow system and process to train and align the LMM/LLM to domain specific principles.

In an alternative embodiment, the LLM or LMM may be trained and aligned to the domain specific principles using an agentic workflow system as shown in FIGS. 5A and 5B as described below. Note that the agentic workflow system and method (discussed below with reference to FIGS. 5A-7) may be used to generate synthetic instructions used to train/align the LLM/LMM as shown in FIG. 2 and/or the agentic workflow system and method may generate the synthetic instructions that may be used as part of the alignment processes 410 in FIG. 4 for post inference alignment of an already trained LLM/LMM.

FIG. 5A illustrates an agentic workflow system 500 being used to train and align an LLM/LMM to domain specific principles. In one embodiment shown in FIG. 5, a first computer system 502 may have a "to be trained" first LLM/LMM 502A (known as a student LLM/LMM) and a second computer system 504 may have a trainer second LLM/LMM 504A (known as a teacher LLM/LMM). Each LLM/LMM 502A, 504A may be implemented as a plurality of lines of computer code/instructions (executed by a processor of each respective computer system 502, 504) to implement, for example, the transformer used for the LLM/LMM and the LLM/LMM 502A may be trained and aligned to the set of domain specific principles. Note that, in another embodiment, the first and second LLMs/LMMs 502A, 504A may both be hosted or executed on a single computer system. Each computer system may be implemented using cloud computing resources, such as those provided by Amazon web services (AWS), Microsoft Azure, etc., and may include one or more processors, memory, database servers, etc., on which the LLMs/LMMs are implemented.

Using the system 500 in FIG. 5A, the second LLM/LMM (teacher) 504A may be used to generate a set/dataset of synthetic instructions that may be used to train and align the first LLM/LMM (student) 502A or used as part of the alignment process 410 shown in FIG. 4 for an already trained LLM/LMM. Each LLM/LMM 502A, 504A may have access to a one or more pieces of domain principles content 506 that may be used to train/align the LLM/LMM 502A and used by the second LLM/LMM 504A to generate the set of synthetic instructions. The one or more pieces of domain principles content 506 may be document/s with domain principles or policies (e.g. a word document, a PDF file, a powerpoint (PPT) file, a list of urls, html etc.) that the student LLM 502A must learn/memorize. The one or more pieces of domain principles content 506 may also include other types of content with domain principles or policies. The teacher LLM/LMM 504A may also have access to one or more teacher resources 508 that may be used by the teacher LLM/LMM 504A to generate the one or more synthetic instructions used to train/align the student LLM/LMM 502A. The one or more teacher resources 508 may include a web search API, a code interpreter and one or more calculators. Details of a method to generate the synthetic instructions/one or more prompts to align an AI model are shown in FIGS. 6A-7B and described below. Thus, the teacher resources 508 may include the plurality of lines of instructions/computer code executed by a processor of the teacher computer system that implements the method shown in FIGS. 6A-7B below.

Using the system 500, the student LLM/LMM 502A may be trained to perform a plurality of tasks/skills using the synthetic instructions generated by the teacher LLM/LMM 504A. The tasks/skills being trained/aligned may include, for example, question and answer (Q&A), summarization, quantitative reasoning, NLP tasks, etc. on the one or more piece(s) of content or parts of one or more document(s). The teacher LLM/LMN 504A may thus generate one or more teaching synthetic instruction(s) to "cover" all the tasks/skills. Examples of the tasks/skills, the synthetic instructions/one or more prompts and the resultant alignment of a response an AI model (LLM or LMM) (the aligned response generated are described below in more detail.

FIG. 5B illustrates more details of the agentic workflow system and process to train and align the LMM/LLM to domain specific principles that uses the same student system 502 and teacher system 504 as described above that have a student model 502B and a teacher model 504B, respectively.

Each model 502B, 504B may be implemented as a plurality of lines of instructions/computer code that may be executed by the computer system that hosts the student 502 and teacher 504 to implement the processes and operations of each of the student model and teacher model as discussed below. As shown in FIG. 5B, the teacher model 504B may receive principles and produce the synthetic instruction set that may be used to train (see FIG. 2 above) or post-train (See FIG. 4) above the Artificial intelligence model ("AIM" including an LLM or an LMM) which are then communicated (as acceptable synthetic instructions to the student model 502B). The acceptable synthetic instructions are then used so that the AIM is trained or post-trained to be aligned with the one or more principles of a particular domain. Thus, the teacher 504 may perform agent based knowledge distillation that distills the knowledge (from the one or more pieces of content) into high quality data sets to train AIMs to be aligned to the principles in the knowledge. Thus, the teacher model 504B may generate a plurality of synthetic instructions that may be used to train (such as shown in FIG. 2) or post-train with alignment processes (such as shown in FIG. 4) the AIM of the student 502 so that one or more responses from the student AIM to a prompt/query from a user are one or more aligned responses and each aligned response is aligned to the one or more principles of the particular domain.

As shown in FIG. 5B, there may also be a known ingestion process 512 that ingests the pieces of content and provides the ingested pieces of content to each of the student 502 and the teacher 504. The piece of content may provide the knowledge that is used to align the student AIM based on the knowledge in the pieces of content. Each piece of content that is ingested may be structured or unstructured pieces of content wherein each piece of content may be a knowledge file (policies, PDFs, DB's, audio files, video files, etc). The pieces of content ingested are available to both the student model and the teacher model wherein the teacher model distills the one or more principles from the knowledge and then transfers the one or more principles to the student model 502B that is now trained and/or post-trained to be aligned with the one or more principles.

The student model 502B that is trained or post-trained with the one or more principles (in one embodiment stored in a form of one or more acceptable instructions stored in a principles and task definitions store 510 of the student 502) may include an aligned LLM or LMM model. For example, in one implementation, the student model 502B may be a chatbot agent (or chat agent) whose responses to a user are driven by an LLM that has been aligned with the one or more principles. An example of this chatbot agent may be a chatbot agent that is aligned to one or more principles of particular domains such as the airline industry policies in which the knowledge to generate the one or more principles may include one or more of baggage and optional fees policy, a bags policy, a restricted items policy, a baggage delivery service piece of content, a lost and found policy and a special assistance policy. Another example, is a chatbot aligned with US Food and Drug Administration (FDA) principles so that the system and method disclosed may be used to policy-align a generalist model to a particular section of Title 21 of the United States Code. Title 21 primarily deals with food and drugs. It outlines the federal regulations regarding the manufacture, distribution, and sale of food, drugs, and cosmetics to ensure safety, efficacy, and security. This includes regulations enforced by the FDA (Food and Drug Administration), such as the approval processes for new drugs and the standards for food safety.

The teacher model 504B may perform a recursive knowledge distillation process by which, using the pieces of content ingested, a plurality of instructions may be generated which may be delivered to the student 502 when acceptable to train or post-train the student LLM/LMM 502A for the one or more principles of the particular domain. The knowledge distillation process may include a generating process 514, a critic process 516 and a routing process 518. The knowledge distillation process may further include a process 520 to request human assistance to perform the knowledge distillation and generate the plurality of instructions. As part of process 520, a human expert may be observing/monitoring the generation of the teacher model and can interrupt/adjust as needed. In addition or alternatively, the system itself may stop and comment "We need a human to intervene here and see if this is correct, or provide more feedback" etc. For example, the original document text may be:

The owner or operator of a cosmetic product establishment which is not exempt under § 710.9 and engages in the manufacture or packaging of a cosmetic product is requested to register for each such establishment, whether or not the product enters interstate commerce. This request extends to any foreign cosmetic product establishment whose products are exported for sale in any State as defined in section 201(a)(1) of the act. No registration fee is required.

The system may have generated a draft QA pair that is:
Question: Are all cosmetic product establishments required to register with the FDA?
Answer: Cosmetic product establishments are requested to register unless exempt under § 710.9, including foreign establishments exporting to the U.S.

The system may generate the following message and pause/stop as one example of how human intervention may occur:
PAUSE—AMBIGUITY CANNOT BE RESOLVED—request human to help resolve:
Does "requested to register" mean registration is mandatory or voluntary under FDA guidelines?Please clarify if this implies a legal requirement or simply a recommendation.
::SYSTEM PAUSES::

Using the pieces of content ingested, the generation process 514 may generate a first plurality of instructions for one or more principles of the particular domain as described below in more detail. A sample of these first plurality of instructions may be input to the critic process 516 that programmatically performs a critique on each instruction and perform refinement of the QA pair. For example, a summary may be refined across sub-trees, improving its quality iteratively. The high-level document summary may be:

The document outlines the voluntary registration process for cosmetic product establishments, detailing who should register, how to register, the information required, and exemptions.

The system may perform a phase 1 refinement so that the summary becomes:

The document explains the voluntary registration process for cosmetic product establishments, including who should register (§ 710.1), the 30-day registration timeline (§ 710.2), and how to obtain and submit the registration form (§ 710.3). It specifies the required information, such as the establishment's name, address, business type (§ 710.4), and the need to update or cancel registrations if circumstances change (§ 710.5). Exemptions apply to certain professionals and organizations (§ 710.9).

The system then may perform a phase 2 refinement so that the summary becomes:

The document governs the voluntary registration of cosmetic product establishments, emphasizing the request for owners or operators to register, including foreign entities exporting to the U.S. (§ 710.1). Registration must occur within 30 days of commencing operations (§ 710.2) by submitting Form FD-2511, available from the FDA, which requires detailed information about the establishment (§ 710.3, § 710.4). Amendments to registration must be submitted within 30 days of any changes (§ 710.5), and the FDA assigns a permanent registration number (§ 710.6). Misrepresentation of registration status is considered misleading (§ 710.8). Exemptions cover specific categories like beauty shops, medical institutions, and those solely manufacturing for research (§ 710.9).

Thus, the system may iteratively refine the summaries and thus the other processes to generate better alignment data to train or post-train the student model.

The critic 516 may determine that each instruction aligns with the one or more principles of the particular domain (it is acceptable) or that the instruction does not align with the one or more principles of the particular domain (it is not acceptable). In other words, any generated data (QA pair, for example) that does not need further refinement (an example of which is set forth above) may be "acceptable."

The routing process 518 may then route the acceptable instructions onto the student model 502B and route the unacceptable instructions back to the generation process 514 for adjustment. Using this recursive knowledge distillation process, the teacher model 504B uses the pieces of content for the particular domain to generate the plurality of instructions that may be used to train or post-train the student model to be aligned to the one or more principles of the particular domain. As mentioned above, the recursive knowledge distillation process includes the human intervention process 520 as needed.

Multi-Stage Agentic Workflow for Domain-Specific LLM Alignment

Using the agentic system architecture of FIGS. 5A and 5B discussed above or another agentic system architecture, a multi-stage agentic workflow process may be performed to generate the prompts/instructions that may be used to align the artificial intelligence model to a specific domain. In other words, the process/workflow is a methodology for aligning artificial intelligence models (LLMs or LMMs) to learn domain-specific principles through a multi-stage process of document processing, knowledge extraction, and synthetic instruction generation of training data. Similarly, parts of the agentic system and workflow that are used for generating the data for fine-tuning can be used as guardrails/system prompts/chain-of-thought/iterative self-refinement to force the model to think harder before giving an aligned answer.

FIG. 6 illustrates an agentic workflow method 600 for generating a synthetic dataset of instructions. In one implementation, the process 600 in FIG. 6 may be performed by the computer system 504 that hosts/executes the teacher LLM/LMM 504A and may be performed using the teacher resources 508 in FIG. 5. However, the method 600 may be performed using other computer system resources and architectures. The method 600 may be performed for each piece of content (document, podcast, blog, audio, etc.) that may be used for training data to align an AI model (LLM or LMM) to the domain desired by the user, such as the domain examples set forth above.

In the method, a structured representation of each piece of content (602) of the domain principles content 508 is created as part of a recursive document summarization process 604. The recursive document summarization may be a first stage of the multi-stage agentic workflow method. The purpose of this first stage is to recursively generate hierarchical summaries of document content that preserve context and relationships between different sections (where each node in the hierarchical document tree corresponds to a document section), based on the agentic system instructions (that is, prompts to an instruction-tuned AI base model).

In one embodiment, the structured representation of each piece of content may be a hierarchical document tree. The structured representation of each piece of content may organize the words, phrases, sections, etc. of each piece of content into a well-known document tree wherein the document tree has one or more nodes and each node in the tree can be connected to many children (depending on the type of tree), but must be connected to exactly one parent, except for the root node, which has no parent (i.e., the root node as the top-most node in the tree hierarchy). A node that does not have a child may be known as a leaf node.

Figure 6A:
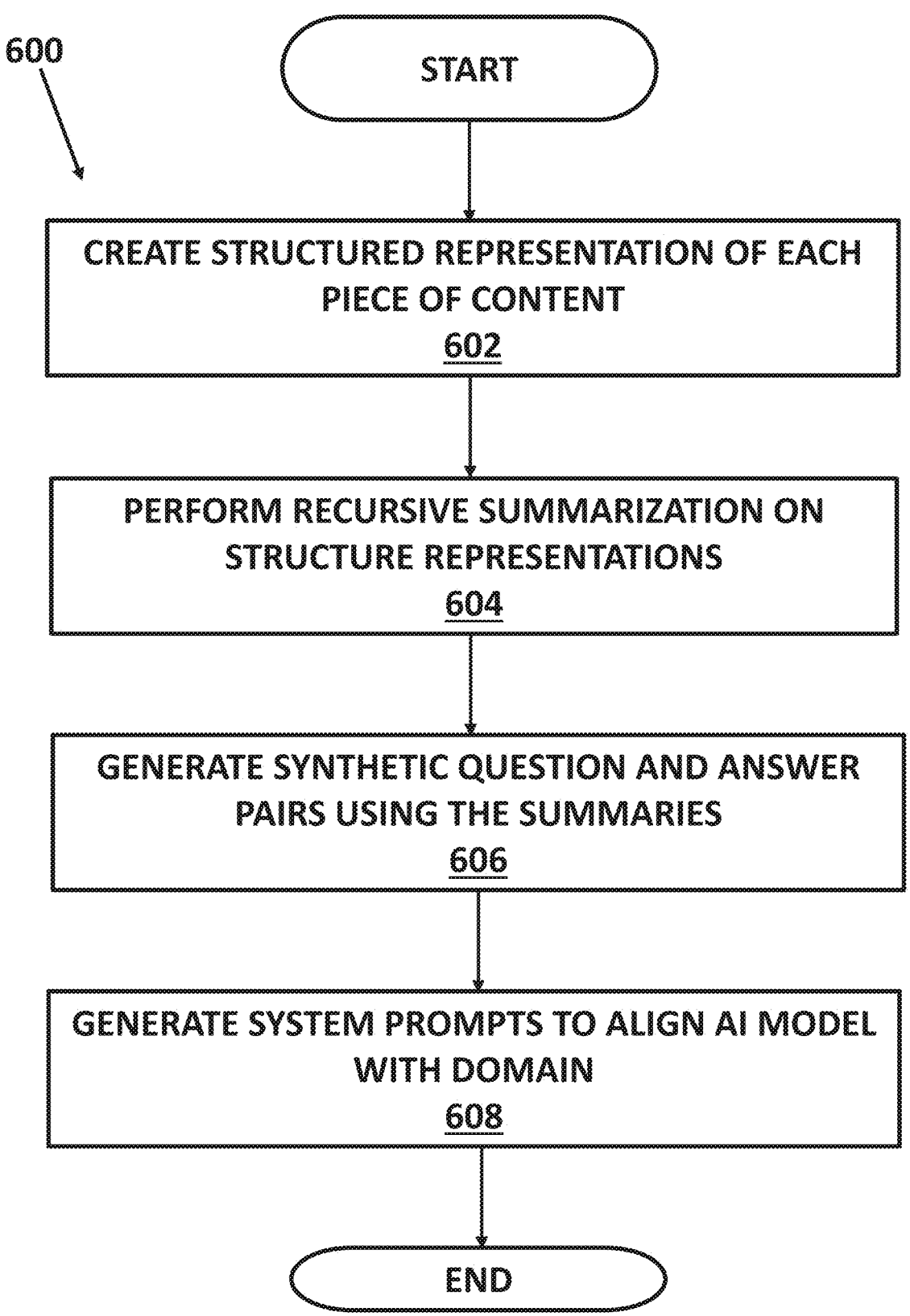
FIG. 6A illustrates an agentic workflow method for generating a synthetic dataset of instructions.
Figure 6B:
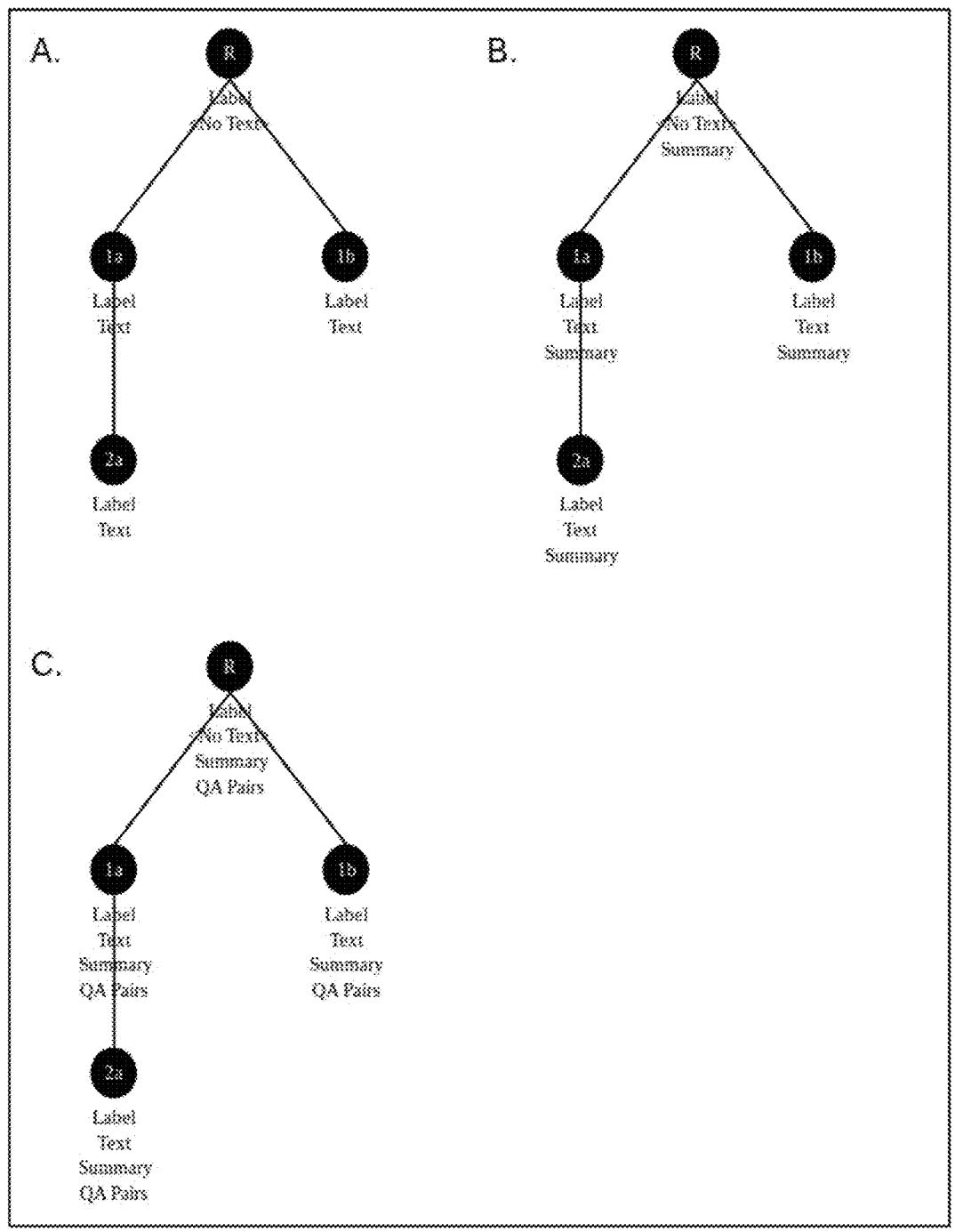
FIG. 6B illustrates the evolution of a hierarchical document tree during the agentic workflow method.

The hierarchical document tree, for each document, may be constructed for each document (See FIG. 6B, tree A for example that shows the label and (if available) extracted text content in each node.) Each node either contains text content or acts as a structural element; that is, some document sections, or nodes, might contain a header label but lack text, such as a high-level document header (e.g. the document's title). As shown in FIG. 6B tree A, each node may be tagged with labels and hierarchical relationships (that is, which document sections, or nodes, are parents or children of other document sections). Appendix C contains an example of a document tree. In this example, the document tree is a customer service plan document for an airlines that shows the labels, content and nodes for the document tree including a root node at the end of Appendix C.

The hierarchical document tree formation may also include leaf Node Processing in which any leaf nodes (nodes in the tree without children) are identified. For each leaf node that has/contains content, the leaf node processing may apply LEAF_SUMMARIZATION_PROMPT (See Table X below) to generate concise yet informative summary for each leaf node. For each leaf node with content, the lead node processing may maintain context through "breadcrumbs" showing path to root and include a Records summary in node's attributes (See FIG. 6B tree B).

The hierarchical document tree formation may also include parent node synthesis in which the method processes non-leaf nodes (each is a parent node) in post-order traversal. For each parent node, the parent node synthesis process collects summaries from all child nodes and applies a NODE_SUMMARIZATION_PROMPT (See Table X below) to synthesize combined summary. The parent node synthesis may also create cohesive narrative incorporating key points from children and store synthesized summary in node's attributes. Note that some nodes might not contain any text content, such as a high-level document header (e.g. the document's title), but they are assigned summaries based on a synthesis of their children's summaries (which themselves are based on the recursively generated summaries of their children, and so on, starting from the document's tree leaf nodes) For example, as shown in FIG. 6B tree A, the root node, R, has no text, but the parent node synthesis may,

TABLE X

Prompts for Recursive Summarization of the Content of a Hierarchical Document Tree
(Precursor to Synthetic Data Generation)

| Prompt | Example |
| --- | --- |
| Leaf Summarization Prompt (LEAF_SUMMARIZATION_PROMPT) | You are a document summarizer. You will be given the name of the current section and the location of the current section you are summarizing in the document using breadcrumbs. You must summarize the content of the current section and produce a single narrative summary. It is very important that you do not include/inject any new information. You must only use the information in the text provided to you. Note that if the text is very short, it's okay if your generated summary closely resembles the original text.<br>Section name: {label}<br>Section breadcrumbs: {breadcrumbs}<br>Section content:<br>------------------<br>{content}<br>------------------ |
| Parent (Non-Leaf) Node Summarization Prompt (NODE_SUMMARIZATION_PROMPT) | You are a document summarizer. You will be given:<br>1. the name of the current section<br>2. the location of the current section you are summarizing in the document using breadcrumbs<br>3. summaries of this sections several sub-sections<br>You must combine and synthesize these summaries into a single narrative summary of the entire section that describes what the section is about, and captures its main points, without just listing out the sub-section summaries. You must condense the information to give a high level overview of the section, and its main points.<br>It is very important that you do not include/inject any new information. You must only use the information in the text provided to you. Remember you must summarize<br>Section name: {label}<br>Section breadcrumbs: {breadcrumbs}<br>Section content:<br>------------------<br>{content}<br>------------------ |

Returning to FIG. 6A, the recursive summarization process 604 is performed. FIG. 6B tree B shows an example of the recursive summarization process (See summary in each node of tree B) even when a node (such as the root node R) does not have any text. Using the recursive summary process, a summary for the root node R is generated from the text and summaries of the other nodes in the document tree. The method may create summaries of increasing extractiveness (lots of details, facts, data, etc.), as it recurses the structured representation (for example, the document tree). As a result, "leaf" sections (that is, sections without any subsection or "children") will be summarized much more exactively than their "ancestors" sections.

Once the recursive summarization is completed, the method may generate question/answer (QA) pairs (606) based on the summaries in the structured representation of the document. FIG. 6B tree C shows an example of the structured representation of the document with the QA pairs for each node. The purpose of the QA pair generation is to create training messages data for the subsequent fine-tuning of an instruction-tuned AI model (LLM and/or LMM). The QA pairs may be synthetically generated so that the QA pairs comprehensively probe the input document's knowledge, based on the agentic system instructions.

Table AA below contains an example of a section of a document on which the recursive summarization process 604 is performed to generate a summary (See middle column of Table AA) and the QA pair generation process 606 is performed to generate QA pairs (see right column in Table AA) for each section of the document.

TABLE AA

| Original Section Text | Recursively Generated Summary | Generated Question + Answer Pairs |
| --- | --- | --- |
| § 710.1 Who should register. The owner or operator of a cosmetic product establishment which is not exempt under § 710.9 and engages in the manufacture or packaging of a cosmetic product is requested to register for each such establishment, whether or not the product enters interstate commerce. This request extends to any foreign cosmetic product establishment whose products are exported for sale in any State as defined in section 201(a)(1) of the act. No registration fee is required. § 710.2 Time for registration. The owner or operator of an establishment entering into the manufacture or packaging of a cosmetic product should register his establishment within 30 days after the operation begins. § 710.3 How and where to register. Form FD-2511 ("Registration of Cosmetic Product Establishment") is obtainable on request from the Food and Drug Administration, 5001 Campus Dr., College Park, MD 20740, or at any Food and Drug Administration district office. The completed form should be mailed to Cosmetic Product Establishment Registration, Food and Drug Administration, 5001 Campus Dr., College Park, MD 20740. [39 FR 10059, Mar. 15, 1974, as amended at 68 FR 15355, Mar. 31, 2003; 81 FR 49897, Jul. 29, 2016] § 710.4 Information requested. Form FD-2511 requests information on the name and address of the cosmetic product establishment, including post office ZIP code; all business trading names used by the establishment; and the type of business (manufacturer and/or packer). The information requested should be given separately for each establishment as defined in § 700.3(j) of this chapter. | Cosmetic product establishments involved in manufacturing or packaging cosmetics, whether or not their products enter interstate commerce, are requested to register unless exempt under § 710.9, including foreign establishments exporting products to the U.S. Registration should occur within 30 days of starting operations using Form FD-2511, obtainable from the FDA at 5001 Campus Dr., College Park, MD, or district offices. The form, which requires details such as the establishment's name, address, business trading names, and type of business (manufacturer and/or packer), must be mailed to the same FDA address. No fees are required for registration. | Question: Who is required to register a cosmetic product establishment? Answer: Owners or operators of cosmetic product establishments engaged in manufacturing or packaging cosmetics, including foreign establishments exporting to the U.S., are requested to register unless exempt under specific provisions. Question: When should a cosmetic product establishment register with the FDA? Answer: Registration should be completed within 30 days after the establishment begins manufacturing or packaging cosmetic products. Question: How can an establishment obtain the necessary form for registration? Answer: The registration form (Form FD-2511) can be requested from the FDA's office at 5001 Campus Dr., College Park, MD, or from any FDA district office. Question: What details must be provided when registering a cosmetic product establishment? Answer: The registration form requires the establishment's name, address with ZIP code, all business trading names, and whether it operates as a manufacturer, packer, or both. Question: Is there a fee associated with registering a cosmetic product establishment? Answer: No, there is no fee required for registering a cosmetic product establishment with the FDA. Question: Where should the completed registration form be |

TABLE AA-continued

| Original Section Text | Recursively Generated Summary | Generated Question + Answer Pairs |
|---|---|---|
| | | sent?<br>Answer: Completed registration forms should be mailed to the FDA at Cosmetic Product Establishment Registration, 5001 Campus Dr., College Park, MD 20740. |

Figure 7A:
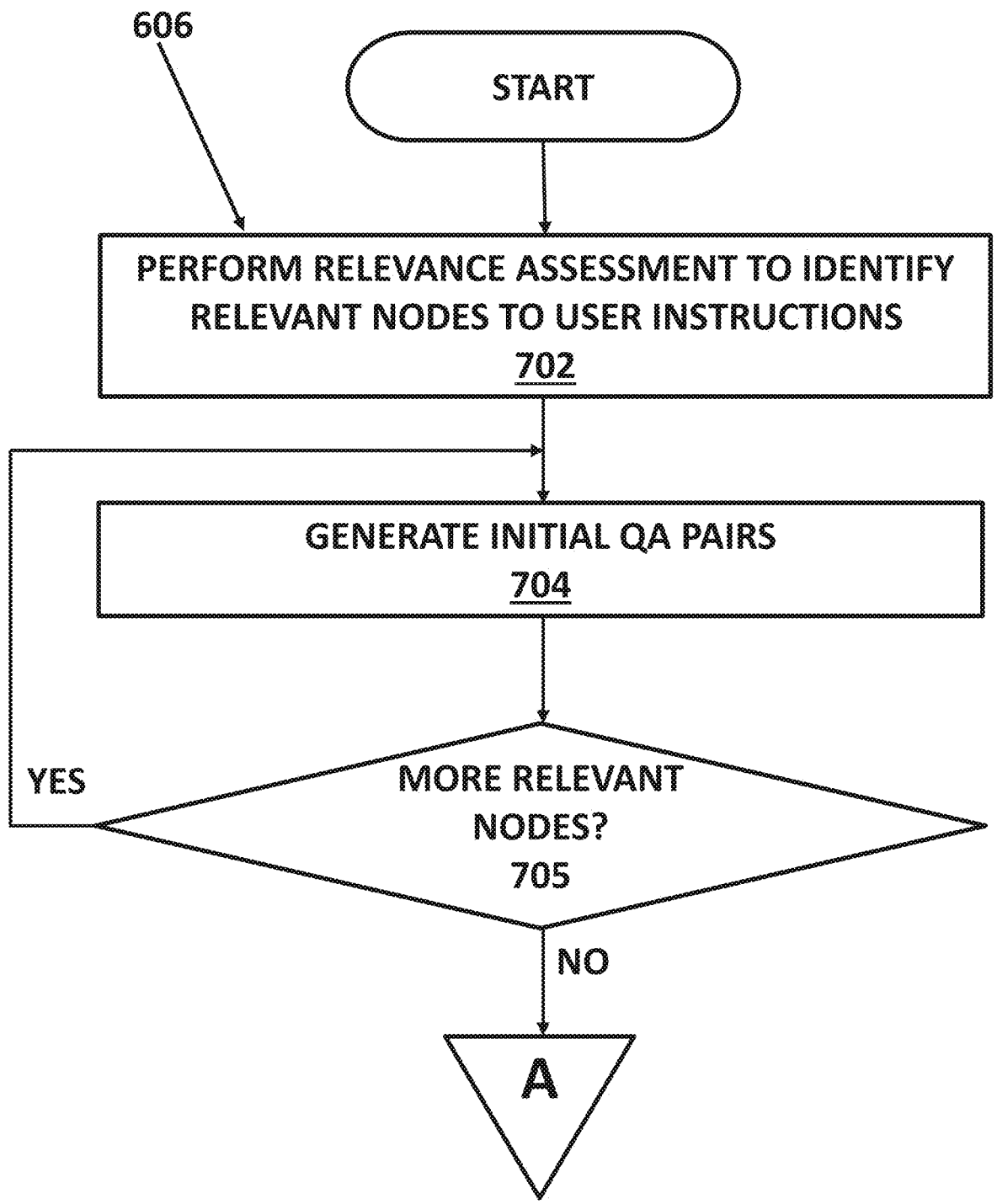
FIGS. 7A and 7B illustrate further details of the method for QA pair generation.
Figure 7B:
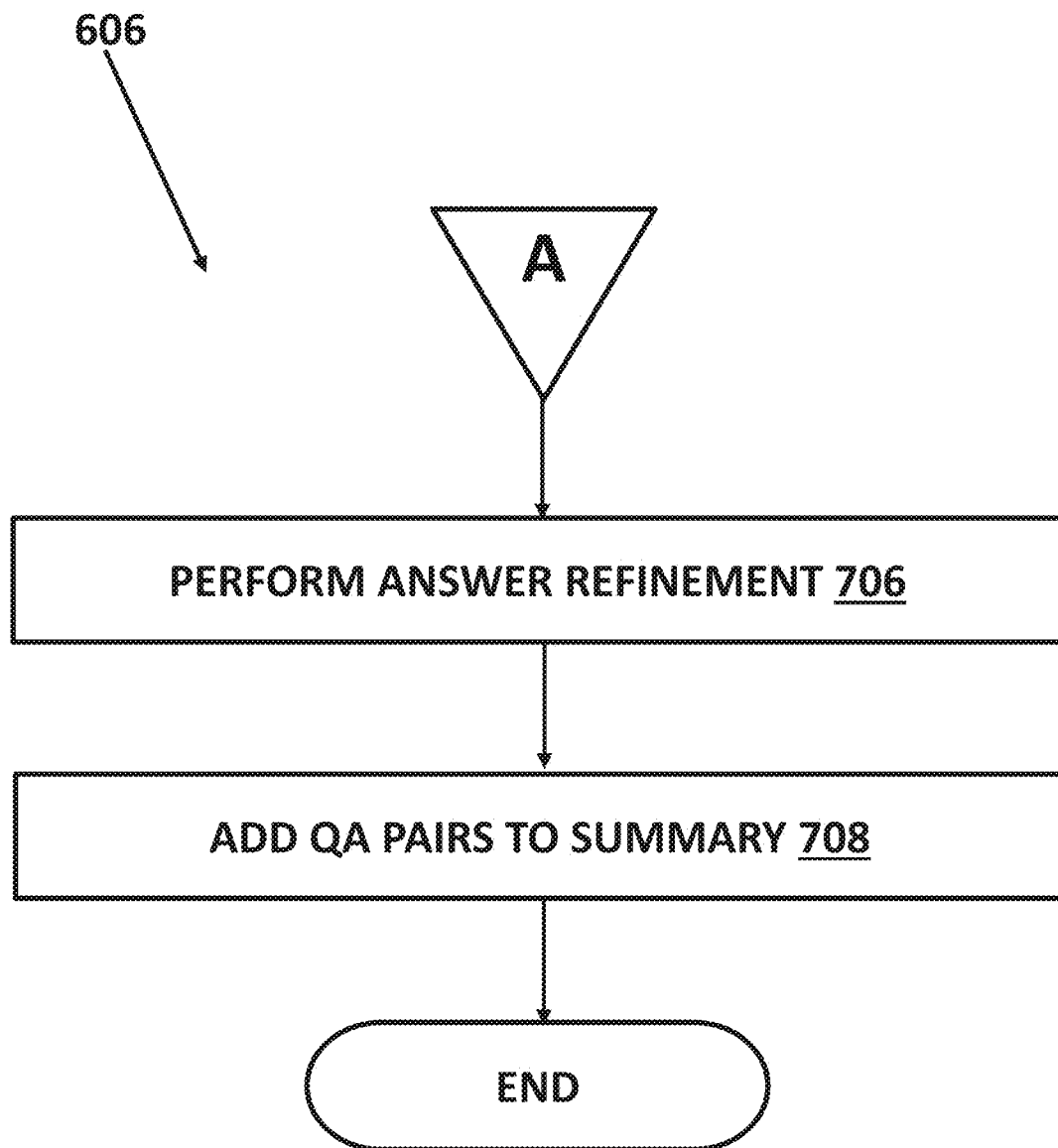

FIGS. 7A and 7B illustrate further details of the method 606 for QA pair generation. The method may first perform a relevance assessment process 702 in which the computer system executing the method 606 may evaluate each node's summary field's relevance to the user's provided instructions as to how the final AI model (LLM or LMM) should be fine-tuned. Table Y below shows examples of relevance prompts (INSTRUCTIONS_RELEVANCE_PROMPT) that may be generated and used to make binary decisions on the nodes as to their relevance. The process 702 may also mark nodes for QA generation based on relevance.

Once the relevant nodes (to the user's instructions to align the AI model (LLM or LMM) are identified, the method may perform an initial QA generation process 704 for each relevant node. The initial QA generation process, for each relevant node, may apply a GENERATION-_TASK_PROMPT (an example of which is shown in Table Y) to create QA pairs in reference to the user's provided instructions. The method 704 may consider a node's hierarchical level to determine question complexity and generate a specified number of unique QA pairs for this relevant node The method may then determine if there are more relevant nodes to process (705) and loop back to process 704 to generate the initial QA pairs for the other relevant nodes. If there are no more relevant nodes, the method moves to an answer refinement process 706 that is shown in FIG. 7B.

During the answer refinement process 706, the computing system that performs the answer refinement may determine if each QA pair needs assessment. For example, the method may evaluate if child nodes of a parent node contain information to improve the parent node's QA pair answers. This process may use a NEED_REFINE_PROMPT (See example in Table Y) to identify relevant children/child nodes and creates list of children indices for refinement. The answer refinement process 706, for each identified child node, may apply a REFINE_TASK_PROMPT (See example in Table Y) to incorporate additional context. The answer refinement process maintains conciseness while improving accuracy, updates QA pairs with refined answers and may record QA pairs list in node's attributes (an example is shown in FIG. 6B tree C).

The method 606 may then perform a summary QA addition process 708 that appends additional QA pair using node's summary (effectively, "What is this section about?"), creates comprehensive overview question for each section and ensures coverage of high-level concepts.

Once the QA pairs are generated, the method 600 may perform a system prompt generation process (608) whose purpose is to create a specialized system prompt that will guide the fine-tuned models behavior and responses in alignment with specific domain requirements of the user. To perform the system prompt generation, the method performs input processing in which the method collects document summary from root node. processes user-provided instructions and context and validates input completeness. Once input processing is completed, the process 608 may perform the prompt generation, such as by using a GEN_SYSTEM-_PROMPT_PROMPT (an example of which is shown in Table Y) to create one or more specialized prompts that incorporates document context and user instructions, establishes model identity and purpose and/or establishes scope of questions and answers to be fielded by the model.

TABLE Y

Prompts for Synthetic Generation of the Training Data Messages for Model Fine-tuning

| Relevance Prompt | Example Results |
|---|---|
| User Instructions Relevance Prompt (INSTRUCTIONS_RELEVANCE_PROMPT) | Your task is to judge whether a given text is relevant to a set of instructions. You will provide a Boolean response indicating whether the text is relevant or not.<br>To complete your task, you are provided with:<br>(1) the text to be judged<br>(2) the document header of the text<br>(3) the instructions to compare against<br>Important points to consider:<br>(1) The relevance should be judged based on whether the text contains information that could be useful in following or understanding the given instructions.<br>(2) The text doesn't need to fully address the instructions to be considered relevant; partial relevance is sufficient.<br>(3) Consider both explicit and implicit |

TABLE Y-continued

Prompts for Synthetic Generation of the Training Data Messages for Model Fine-tuning

| Relevance Prompt | Example Results |
|---|---|
| | relevance. Sometimes the connection might not be immediately obvious but could still be important.<br>(4) If you're unsure, err on the side of marking the text as relevant.<br>The information for your task:<br>1. text: {text}<br>2. document header of the text: {text_header}<br>3. instructions: {instructions}<br>Your output should be a JSON object with a single key: 'relevant', and a boolean value (true or false).<br>Example output:<br>```json<br>{{<br>  "relevant": true<br>}}<br>```<br><br>Or:<br>```json<br>{{<br>  "relevant": false<br>}}<br>```<br><br>Provide only the JSON object in your response; do not include any additional characters before or after the JSON object, including any commentary. |
| QA Pair Generation Prompt (GENERATION_TASK_PROMPT) | Your task is to generate {num_questions} unique question-answer pair(s) about a given text, such that the question can be either fully or partially answered by consulting the content of the text.<br>To complete your task you are provided with:<br>(1) the main text<br>(2) its document header<br>(3) its hierarchical level/location in the document<br>(4) a list of all possible hierarchical levels in the text in decreasing order of generality<br>(5) instructions<br>Note the below important points:<br>(1) If the text has a higher hierarchical level, in general try to bias your generated question to be a "why/how" kind of question (these questions are usually more complex), and if the text has a lower hierarchical level, bias your question (though not always) to be a "what/when/where/who" kind of question (i.e. a question with a straightforward descriptive answer).<br>(2) Your question cannot contain vague references to the text's header, such as 'this section'; any references to the text's header must explicitly state the header name.<br>(3) Your question must include sufficient context; e.g. a question such as 'What happens if a request for confidentiality lacks sufficient data?' contains insufficient context -- here, either the text's header name should be explicitly included in the question, or the context of the question could instead be provided through enhanced descriptive language -- in the foregoing example, the question should be expanded to describe what 'what happens' means and what 'request for confidentiality' refers to (what is being requested?).<br>(4) Both the question and answer must be relevant to the provided instructions. Generate questions that probe aspects of the text pertinent to the instructions, and provide answers that are useful in the |

TABLE Y-continued

Prompts for Synthetic Generation of the Training Data Messages for Model Fine-tuning

| Relevance Prompt | Example Results |
|---|---|
| | context of the instructions.<br>(5) Your output should consist of a list containing {num_questions}-many JSON objects - each with two keys: 'question' and 'answer'.<br>Find below the information relevant to your task:<br>1. text: {text},<br>2. document header of text: {text_header},<br>3. hierarchical level of text: {text_level},<br>4. possible levels in decreasing hierarchical order: ['0', '1', '2', '3', '4', '5', '6', . . . ],<br>5. instructions: {instructions}<br>In your output, do not include any additional characters before or after the list of JSON objects, including any commentary. |
| QA Pair Need-Refinement Prompt (NEED_REFINE_PROMPT) | Your task is to decide if a given generated question-answer pair from a main text could use refinement from any of the children of the node from which the question-answer pair was generated.<br>To complete your task you are provided with:<br>(1) the main text of a given node,<br>(2) the generated question<br>(3) the generated answer<br>(4) a dictionary of index:title of the children of the node from which the question-answer pair was generated<br>Your response should consist only of a list of the indexes of the children whose text would enhance the answer to the question by providing more context or critical information missing in the main text, etc.<br>If you do not think any children should be consulted, return an empty list: '[ ]'<br>Find below the information relevant to your task:<br>1. main text: {text},<br>2. generated question: {question},<br>3. generated answer: {answer},<br>4. children: {children}<br>In your output, do not include any additional characters before or after the list of indexes, including any commentary. |
| QA Pair Refinement Prompt (REFINE_TASK_PROMPT) | Your task is to refine/improve on the current answer to the original question by consulting the additional text provided. If the additional text contains information that would enhance the answer to the original question, you should provide a refined answer. If the additional text does not contain any information that would enhance the original answer to the question, you should just return the original answer.<br>Important: Your refined answer should NOT just simply incorporate the additional text! You must still provide a short, concise answer to the original question. The additional text should only help you refine that answer - not elongate it.<br>Important: Do not include any additional information in your output that is not found in the original question, current answer, or additional text.<br>Find below the information relevant to your task:<br>1. original question: {question}<br>2. current answer: {answer}<br>3. additional text: {additional_text}<br>Your output should consist ONLY of a JSON object with two keys 'useful': true/false (lowercase) - whether the additional text was useful in refining the |

TABLE Y-continued

Prompts for Synthetic Generation of the Training Data Messages for Model Fine-tuning

| Relevance Prompt | Example Results |
| --- | --- |
|  | answer, and 'new_answer': the refined answer if the additional text was useful, or the original answer if the additional text was not useful.<br>In your output, do not include any additional characters before or after the JSON object, including any commentary. |
| Model System Prompt Generation Prompt (GEN_SYSTEM_PROMPT_PROMPT) | Your task is to generate a SYSTEM PROMPT for a custom LLM model. The custom LLM model is being trained to discuss various aspects of a document with a user. You are not being provided with the whole document, just a high level overview of it.<br>You are also being provided with a set of instructions/context that the user has given, expressing their intentions for the custom LLM. These are provided in a conversational format, and you should consider them when generating the system prompt.<br>You must use this document summary and the instructions/context provided by the user to generate a suitable SYSTEM PROMPT for the custom LLM. Recall - a SYSTEM PROMPT is the text that an LLM uses to ground each of its responses. It should establish a basic identity, purpose and scope for the LLM. It is worded as if speaking directly to the LLM - like "You are a chatbot that answers . . . " etc.<br>You are provided with the following information:<br>Document Summary:<br>{document_summary}<br>Instructions/Context:<br>{instructions}<br>Your response should contain a single JSON object with a single key "system_prompt" and a string value containing the system prompt you generate. Include no other commentary before or after. |

Figure 8:
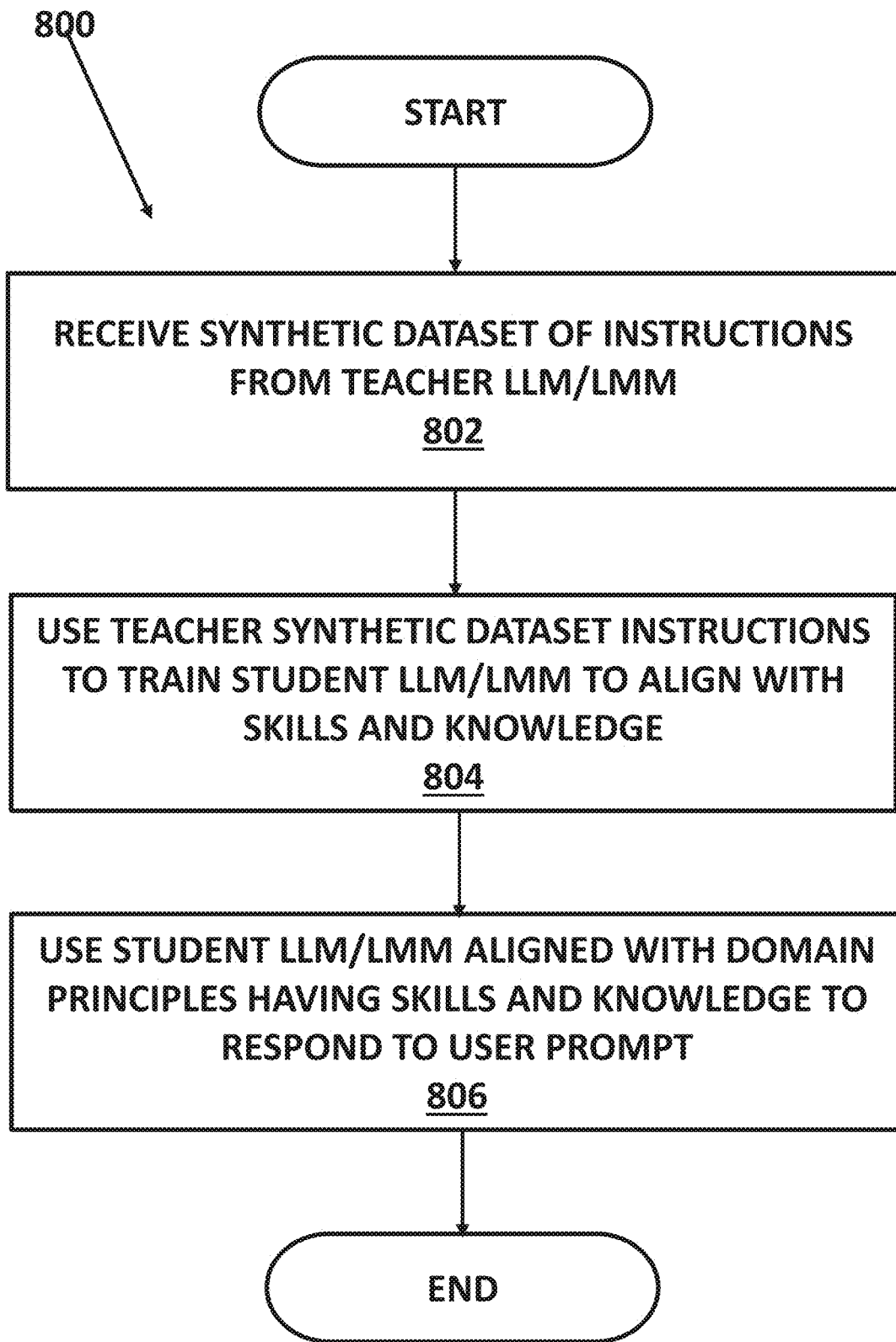
FIG. 8 illustrates a method for aligning an LLM/LMM using the synthetic dataset of instructions generated by the teacher LLM/LMM.

FIG. 8 illustrates a method 800 for aligning an LLM/LMM 502A/502B using the synthetic dataset of instructions generated by the teacher LLM/LMM 504A/504B. In the method, the teacher LLM/LMM 504A/504B has generated the synthetic set of instructions for the particular domain as described above and shown in FIGS. 6A-7 and the accepted synthetic set of instructions for the domain (to align the student with the skills and knowledge relevant to the particular domain) are communicated to the student model /LLM/LMM 502B (802) and stored in the principles and task definitions 510 of the student LLM/LMM 502A. The accepted synthetic set of instructions for the domain are used (804) to train the LLM/LMM 502B to align it with the skills and knowledge of the particular domain. The aligned LLM/LMM 502B may then (806) respond to prompts/queries from a user that is consistent with the skills and knowledge for the particular domain. Thus, the methods in FIGS. 6 and 7 achieve the technical goal of aligning an LLM/LMM to a set of skills and knowledge for a particular domain. Furthermore, as described above, the LLM/LMM 502A may be trained to be aligned with the one skills and knowledge of multiple domains as well.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method, comprising:
   retrieving, by a computer system, a plurality of pieces of content that embody the one or more principles for a specific domain;
   generating, by the computer system, one or more prompts from each of the plurality of pieces of content, the one or more prompts being data to align an artificial intelligence model to the one or more principles for the specific domain;
   wherein generating the one or more prompts further comprises creating, by the computer system for each piece of retrieved content, a structured representation of the pieces of data in each piece of retrieved content; performing, by the computer system on the structured representation for each piece of content, a recursive summarization to generate a summary that is stored back into the structured representation for each piece of content; generating, by the computer system based on the structured representation for each piece of content that includes the summary, at least one question and answer pair (QA pair) that further comprises performing, by the computer system based on the structured representation for each piece of content that includes the summary, a relevance assessment of each node in the structured representation of the pieces of data in each piece of retrieved content to identify a node relevant to a fine tuning direction for the artificial intelligence model: generating, by the computer system, an initial QA pair for each relevant node in the structured representation of the pieces of data in each piece of retrieved content, performing, by the computer system on each initial QA pair, an answer refinement to generate a refined QA pair; and adding, by the computer system, the refined QA pair to the summary of the node; and generating, by the computer system using the QA pair for each piece of content, the one or more prompts to align the artificial intelligence model to the one or more principles for the specific domain;
   training, by a second computer system, using the one or more prompts, the artificial intelligence model to align to the one or more principles for the specific domain; and
   generating, by the second computer system in response to a user query using the aligned artificial intelligence model, a response to the user query that is aligned to the one or more principles for the specific domain.

2. The method of claim 1, wherein the structured representation of each piece of retrieved content is a document tree.

3. The method of claim 2, wherein the document tree further comprises a plurality of nodes wherein each node stores one of a piece of text and a structural element of the piece of retrieved content.

4. The method of claim 1, wherein the artificial intelligence model is one of a large language model and a large multimodal model.

5. The method of claim 1, wherein the specific domain is one of an industry standard, a civility score, an enterprise domain, a set of pieces of content from a computer and a blog post.

6. The method of claim 1 further comprising generating, by the second computer system using the one or more prompts, one or more alignment processes, generating a response to a user query in response to a trained artificial intelligence model and aligning the generated response from the trained artificial intelligence model based on the one or more alignment processes to generate an aligned response to the user query that aligns to the one or more principles for the specific domain.

7. The method of claim 6, wherein the artificial intelligence model is one of a large language model and a large multimodal model.

8. The method of claim 6, wherein the trained artificial intelligence model is one of a large language model and a large multimodal model.

9. A system comprising:
   a teacher computer system having a processor and a plurality of instructions executed by the processor;
   a student computer system having a processor and a plurality of instructions executed by the processor;
   the processor of the teacher computer system executing the plurality of instructions to be configured to:
   retrieve a plurality of pieces of content that embody one or more principles for a specific domain;
   create, for each piece of retrieved content, a structured representation of the pieces of data in each piece of retrieved content;
   perform, on the structured representation for each piece of content, a recursive summarization to generate a summary that is stored back into the structured representation for each piece of content;
   generate, based on the structured representation for each piece of content that includes the summary, at least one question and answer pair (QA pair) that further perform, based on the structured representation for each piece of content that includes the summary, a relevance assessment of each node in the structured representation of the pieces of data in each piece of retrieved content to identify a node relevant to a fine tuning direction for the artificial intelligence model, generate, an initial QA pair for each relevant node in the structured representation of the pieces of data in each piece of retrieved content, perform, on each initial QA pair, an answer refinement to generate a refined QA pair and adding the refined QA pair to the summary of the node of the structured representation that is used to generate the one or more prompts;

generate, using the QA pair for each piece of content, one or more prompts from each of the plurality of pieces of content, the one or more prompts being data to align an artificial intelligence model to the one or more principles for the specific domain; and communicate the one or more prompts to the student computer system; and wherein the processor of the student computer system is configured to generate, using the one or more prompts, one or more alignment processes, generate a response to a user query in response to a trained artificial intelligence model and align the generated response based on the one or more alignment processes to generate an aligned response that aligns to the one or more principles for the specific domain.

10. The system of claim 9, wherein the structured representation of each piece of retrieved content is a document tree.

11. The system of claim 10, wherein the document tree further comprises a plurality of nodes wherein each node stores one of a piece of text and a structural element of the piece of retrieved content.

12. The system of claim 9, wherein the artificial intelligence model is one of a large language model and a large multimodal model.

13. The system of claim 9, wherein the specific domain is one of an industry standard, a civility score, an enterprise domain, a set of pieces of content from a computer and a blog post.

14. The system of claim 9, wherein the processor of the teacher computer system is further configured to communicate the one or more prompts to the student computer system and wherein the processor of the student computer system is configured to train, using the one or more prompts, an artificial intelligence model to align to the one or more principles for the specific domain and generate, in response to a user query using the aligned artificial intelligence model, a response to the user query that is aligned to the one or more principles for the specific domain.

15. The system of claim 14, wherein the artificial intelligence model is one of a large language model and a large multimodal model.

16. The system of claim 9, wherein the trained artificial intelligence model is one of a large language model and a large multimodal model.

* * * * *